United States Patent
Arrow et al.

(10) Patent No.: US 9,581,972 B1
(45) Date of Patent: Feb. 28, 2017

(54) FLEXIBLE UNITARY CHARGING BAND SYSTEM

(71) Applicant: Reserve Strap, Inc., Austin, TX (US)

(72) Inventors: John Arrow, Austin, TX (US); Lane Musgrave, Austin, TX (US); Bailey Jones, Austin, TX (US); Jessica Campbell, Austin, TX (US); Charles Hartzell, Portland, OR (US)

(73) Assignee: RESERVE STRAP, INC., Austin, TX (US)

( * ) Notice: Subject to any disclaimer, the term of this patent is extended or adjusted under 35 U.S.C. 154(b) by 0 days.

(21) Appl. No.: 15/144,327

(22) Filed: May 2, 2016

Related U.S. Application Data

(60) Provisional application No. 62/269,472, filed on Dec. 18, 2015, provisional application No. 62/329,789, filed on Apr. 29, 2016.

(51) Int. Cl.
*H02J 7/00* (2006.01)
*G04C 10/00* (2006.01)
(Continued)

(52) U.S. Cl.
CPC ............ *G04C 10/00* (2013.01); *G04C 10/04* (2013.01); *G06F 1/163* (2013.01); *G06F 1/3212* (2013.01);
(Continued)

(58) Field of Classification Search
CPC ..... G04C 10/00; G04C 10/04; H01M 2/1044; H01M 2/1055; H01M 2/1066; H02J 7/0054
(Continued)

(56) References Cited

U.S. PATENT DOCUMENTS

| 5,889,737 | A | * | 3/1999 | Alameh | ................. | G04C 10/00 368/204 |
| 6,874,931 | B2 | | 4/2005 | Noirjean et al. | | |

(Continued)

OTHER PUBLICATIONS

9TO5Mac, Third-party bands, replacement straps, & battery packs for Apple Watch. Apr. 19, 2015. Available at http://9to5mac.com/2015/04/19/third-party-bands-replacement-straps-battery-packs-apple-watch [Retrieved May 2016] (12 pgs.).
(Continued)

*Primary Examiner* — Richard Isla Rodas
*Assistant Examiner* — David V Henze-Gongola
(74) *Attorney, Agent, or Firm* — Wilson, Sonsini, Goodrich & Rosati

(57) ABSTRACT

A band system for a wearable device, or alternately, a flexible smart strap, worn as an article of apparel, for providing reserve power and enhanced functionality to a portable digital device. The band system or smart strap provides both a stylish fashion accessory and a functional rechargeable secondary power source to address an increasing demand for additional battery life due to greater digital demands and functionality of digital smart devices and optionally includes an interchangeable detachable strap with integrated rechargeable batteries, a charging circuit that integrates with a digital device, an interface for recharging the smart strap batteries or a connected portable digital device battery in combination with the smart strap batteries. An additional interface is also described, capable of providing further functionality for various types of data transfer.

20 Claims, 19 Drawing Sheets

(51) Int. Cl.
  *G06F 1/16* (2006.01)
  *G06F 1/32* (2006.01)
  *H01M 2/10* (2006.01)
  *G04C 10/04* (2006.01)

(52) U.S. Cl.
  CPC ....... *H01M 2/1044* (2013.01); *H01M 2/1055* (2013.01); *H01M 2/1066* (2013.01); *H02J 7/0044* (2013.01); *H02J 7/0052* (2013.01); *H02J 7/0072* (2013.01); *H02J 2007/0062* (2013.01)

(58) Field of Classification Search
  USPC ......................................................... 320/103
  See application file for complete search history.

(56) References Cited

U.S. PATENT DOCUMENTS

| | | |
|---|---|---|
| 6,973,185 B2 | 12/2005 | Anlauff |
| 8,624,554 B2 | 1/2014 | Ajagbe |
| 9,041,352 B2 | 5/2015 | Krause et al. |
| 9,105,930 B2 | 8/2015 | Yang |
| 2003/0099164 A1 | 5/2003 | Noirjean et al. |
| 2004/0119442 A1 | 6/2004 | Lee et al. |
| 2005/0070154 A1* | 3/2005 | Milan .................... H01R 31/06 439/502 |
| 2009/0069045 A1 | 3/2009 | Cheng |
| 2012/0166697 A1 | 6/2012 | Hu et al. |
| 2013/0171490 A1 | 7/2013 | Rothkopf et al. |
| 2014/0232328 A1 | 8/2014 | Pegg |
| 2015/0097517 A1* | 4/2015 | Stephenson ......... H01M 2/0207 320/107 |
| 2015/0115870 A1* | 4/2015 | Vance .................... H02J 7/0042 320/101 |
| 2015/0130623 A1 | 5/2015 | Robison |
| 2015/0130700 A1 | 5/2015 | Chen et al. |
| 2015/0137731 A1* | 5/2015 | Kim ...................... H02J 7/355 320/101 |
| 2015/0137733 A1 | 5/2015 | Si |
| 2015/0241922 A1 | 8/2015 | Farjami |

OTHER PUBLICATIONS

Co-pending U.S. Appl. No. 29/555,433, filed Feb. 22, 2016.

\* cited by examiner

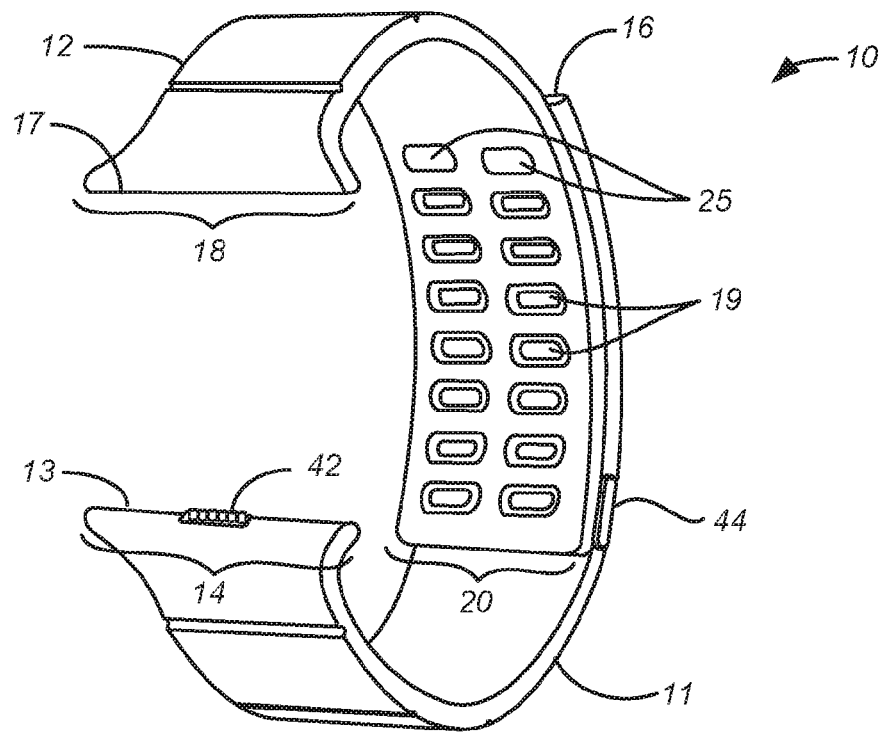
*FIG. 1-A*
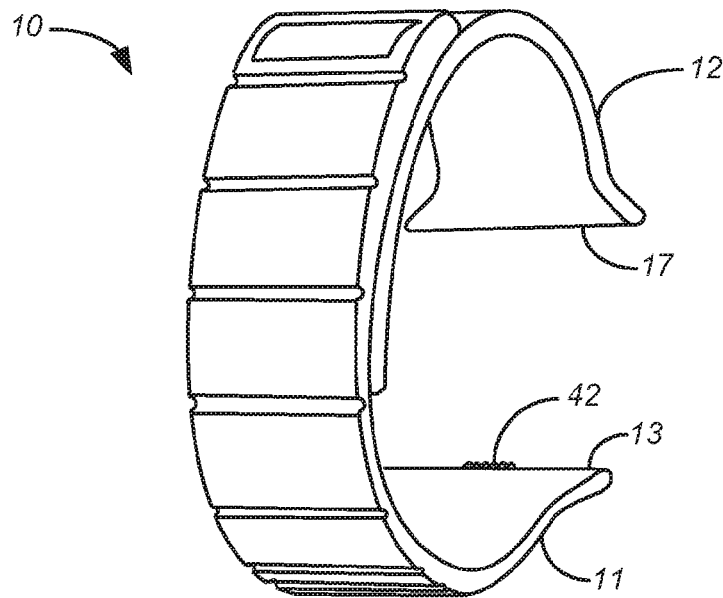
*FIG. 1-B*

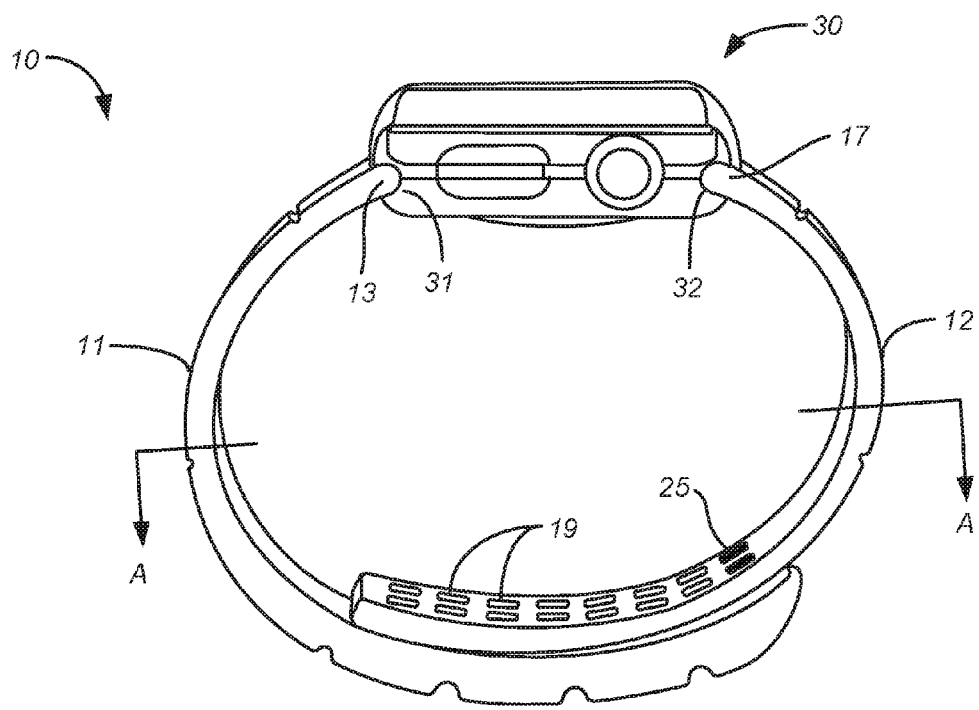
FIG. 4-A
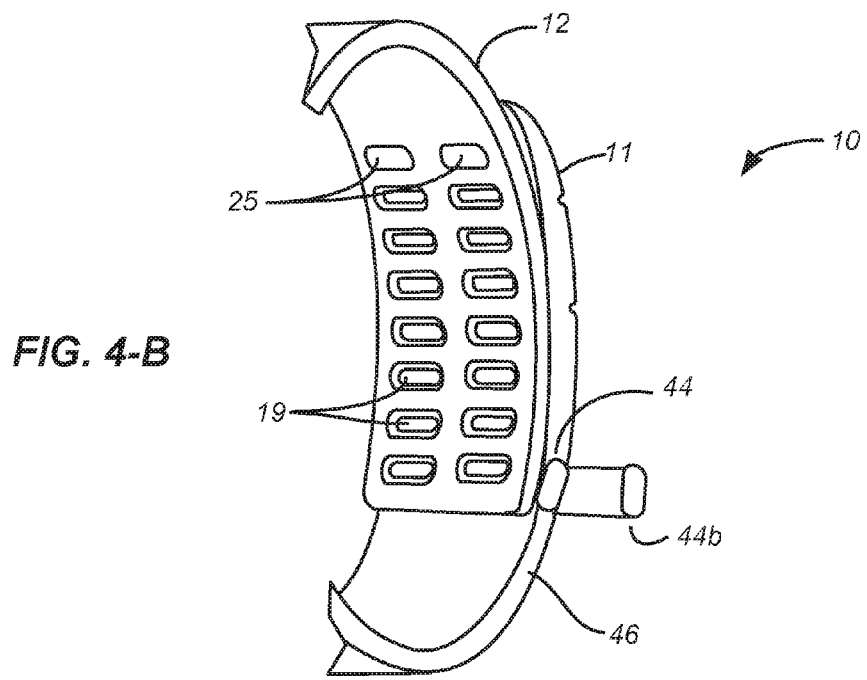
FIG. 4-B

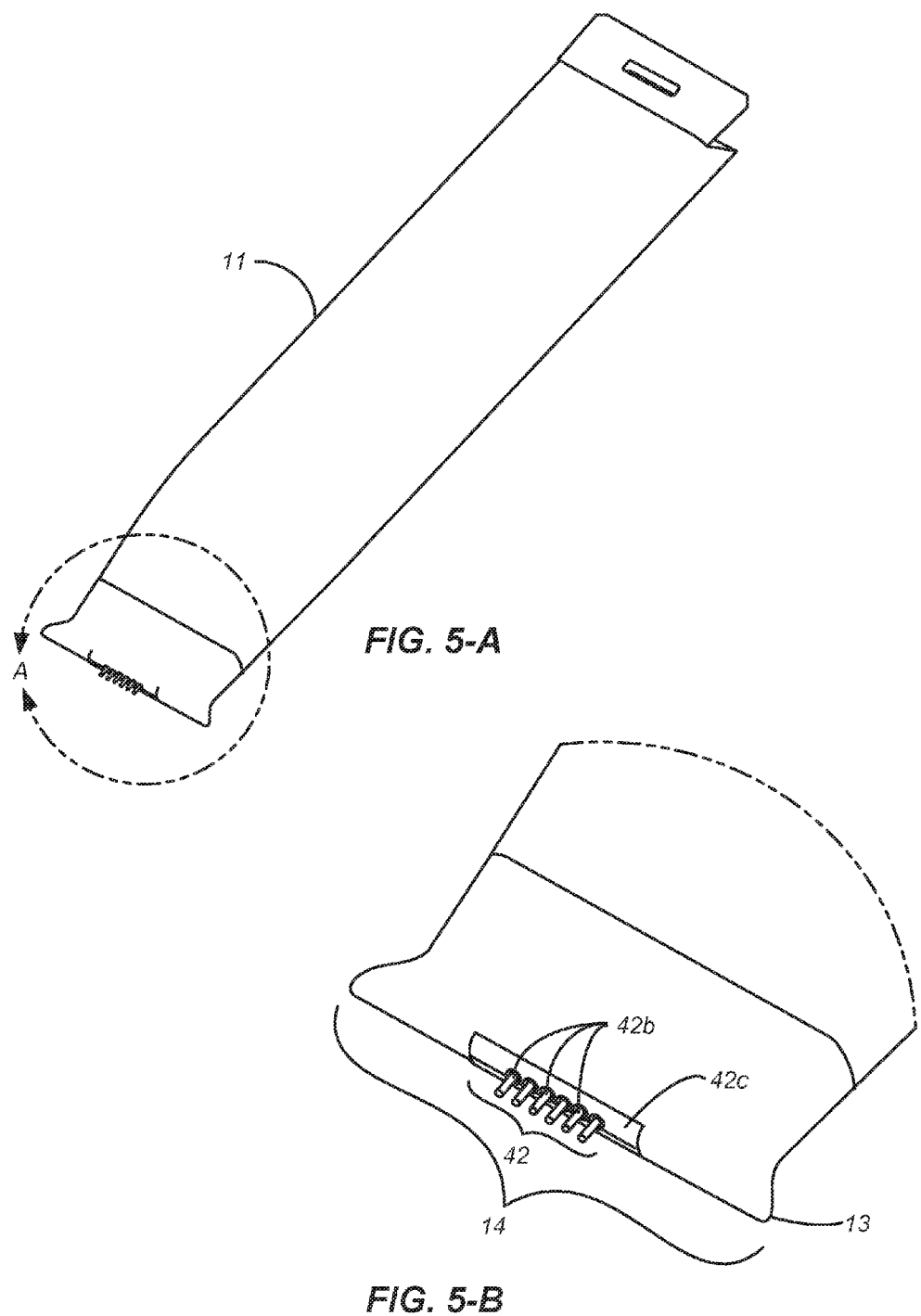
FIG. 5-A
FIG. 5-B

FIG. 7-A

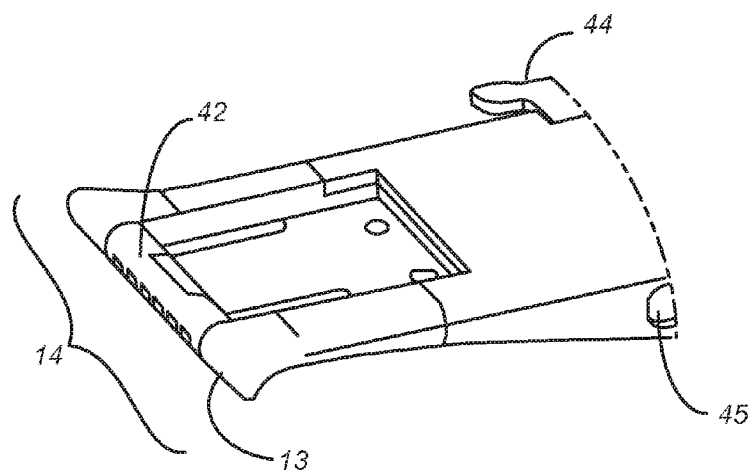
FIG. 7-B
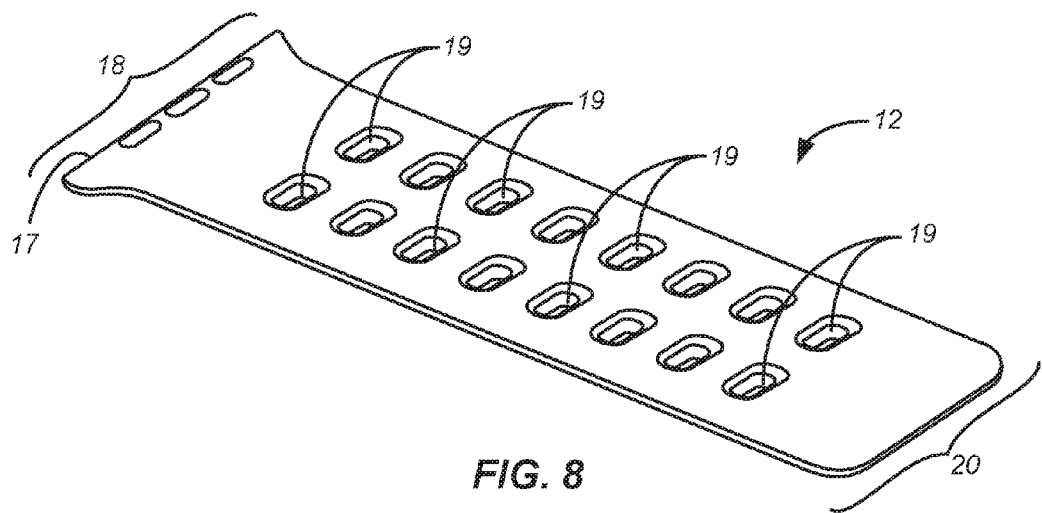
FIG. 8

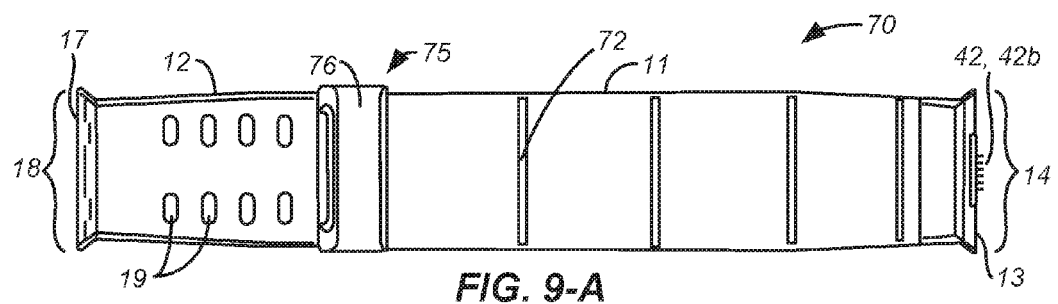
FIG. 9-A
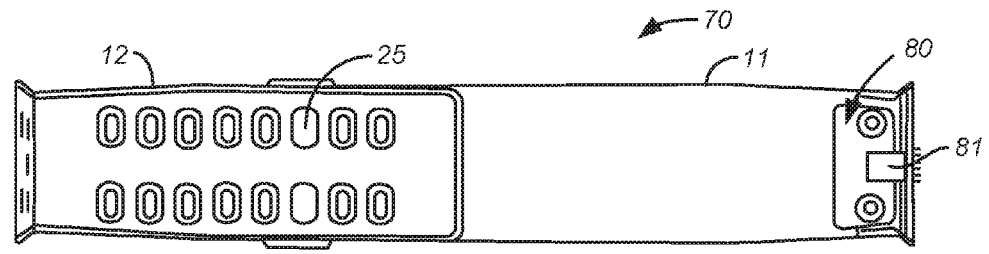
FIG. 9-B
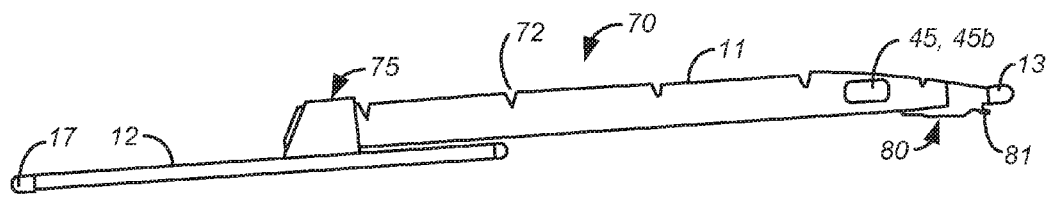
FIG. 10-A
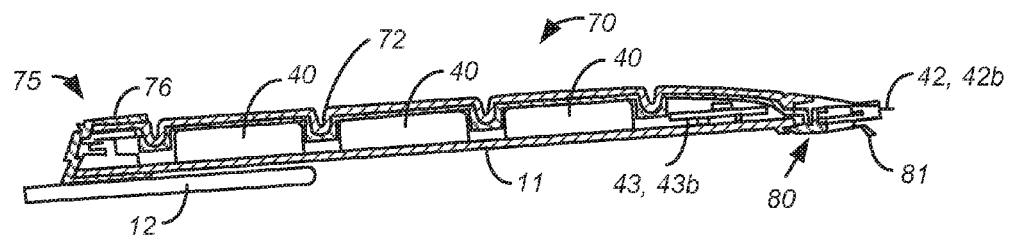
FIG. 10-B

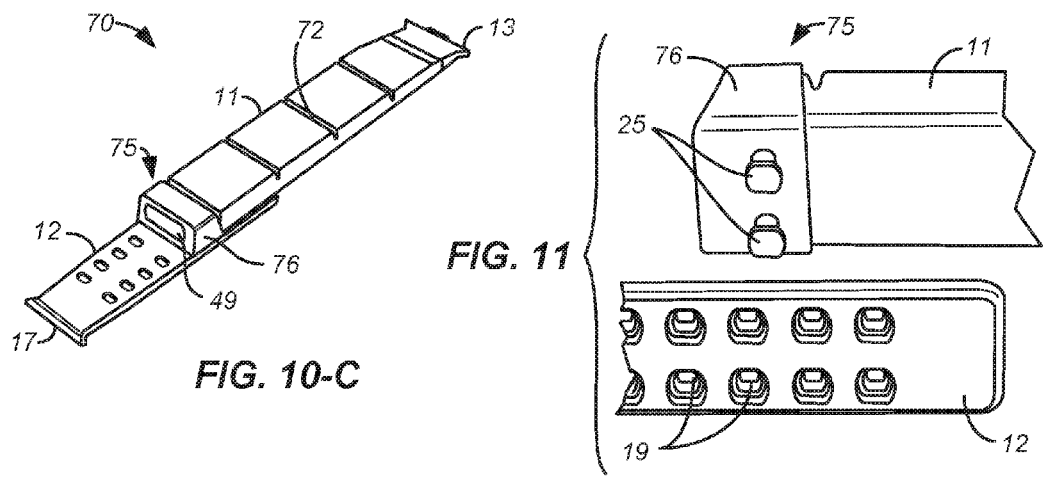
FIG. 10-C
FIG. 11
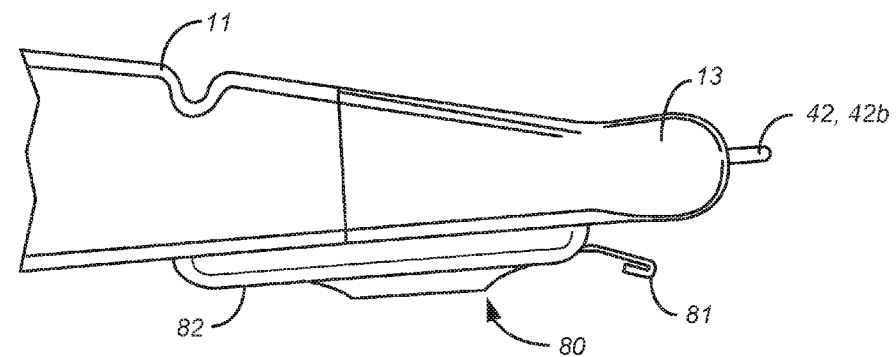
FIG. 12-A
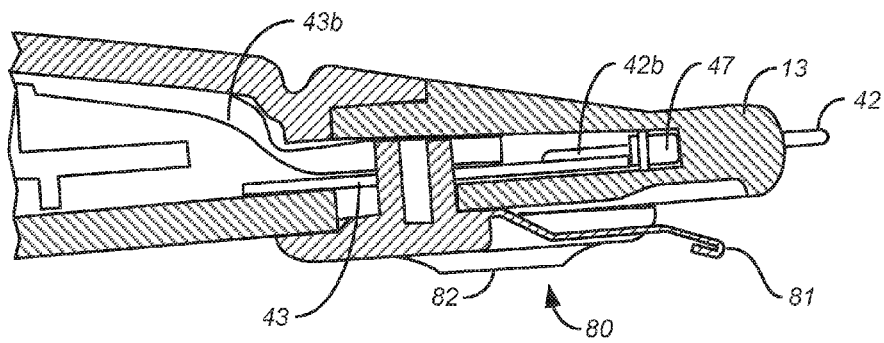
FIG. 12-B

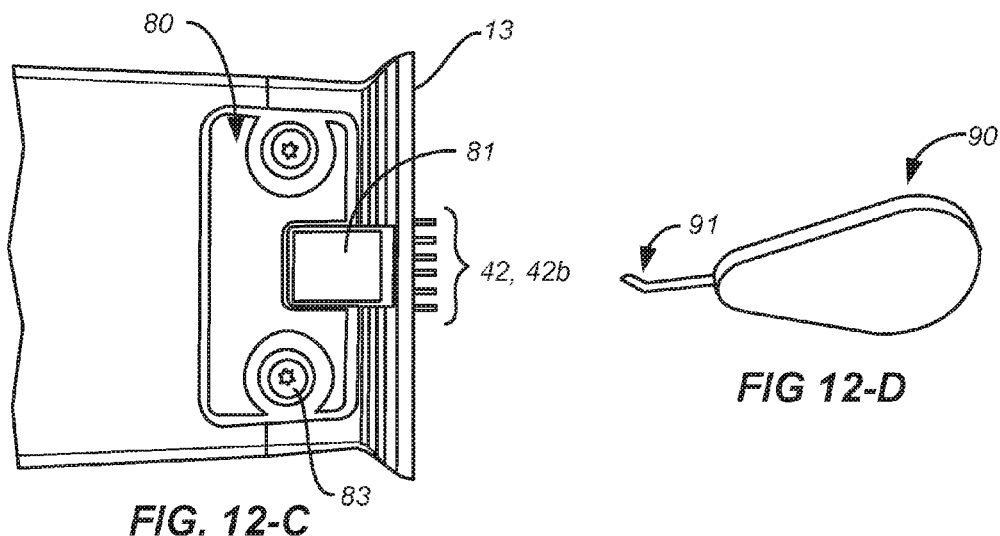
FIG. 12-C
FIG 12-D
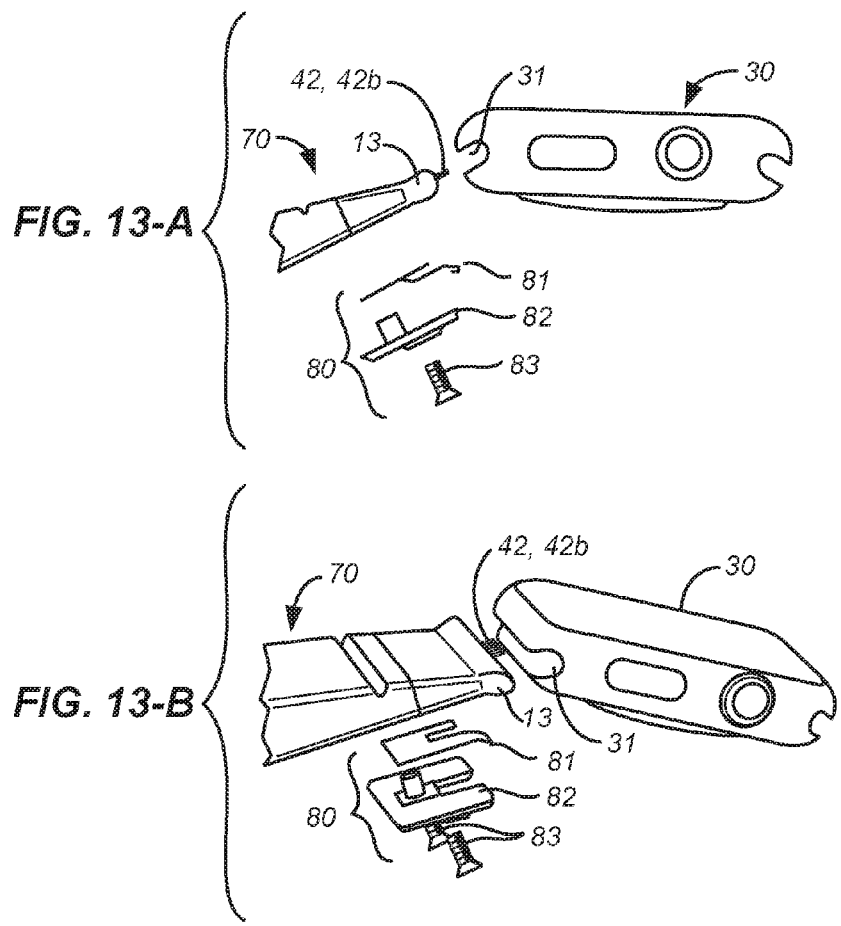
FIG. 13-A
FIG. 13-B

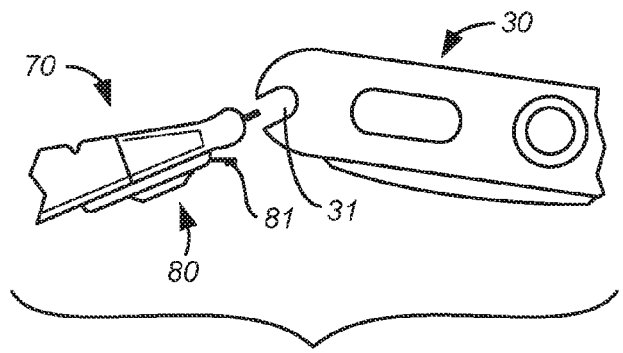
FIG. 14-A
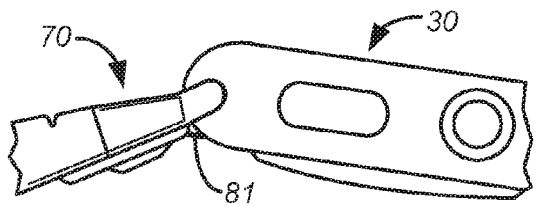
FIG. 14-B
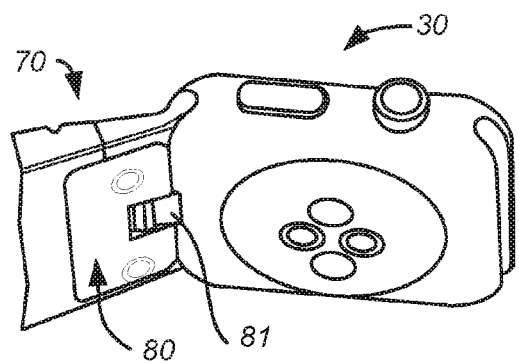
FIG. 15-A
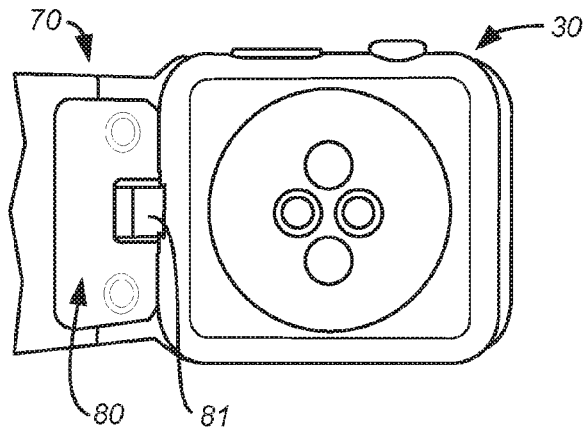
FIG. 15-B

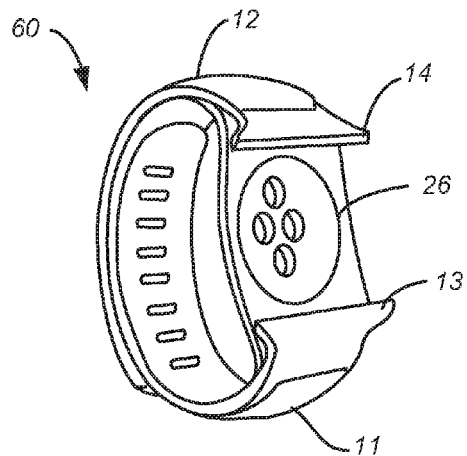
FIG. 16-A
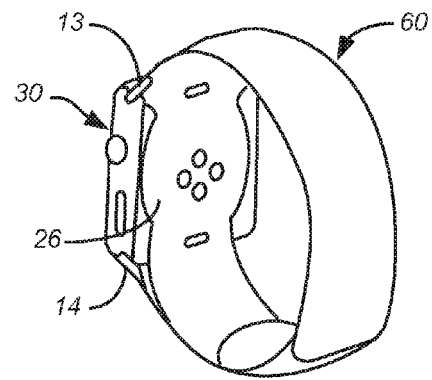
FIG. 16-B
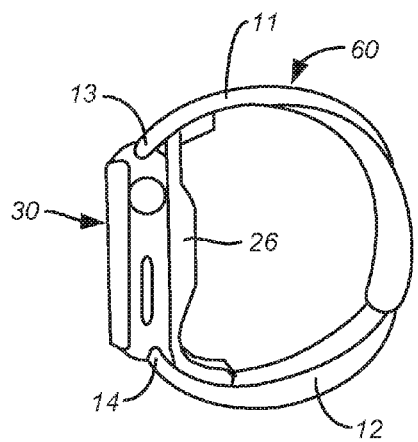
FIG. 16-C
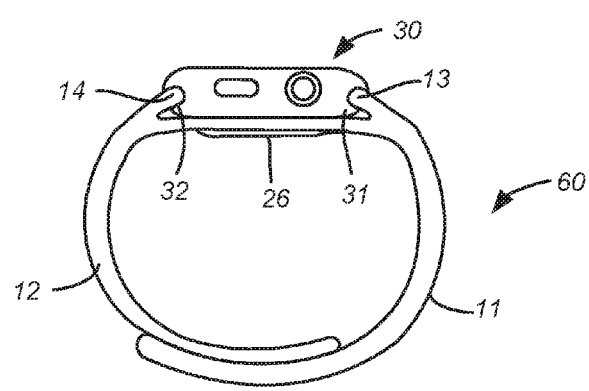
FIG. 16-D
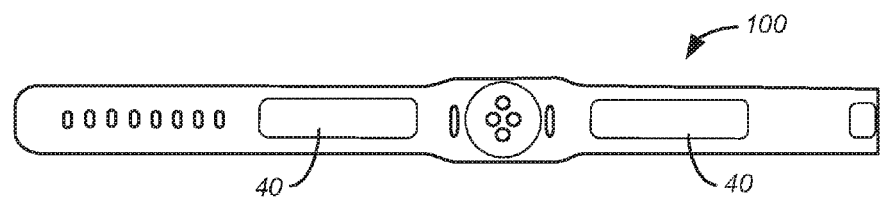
FIG. 17

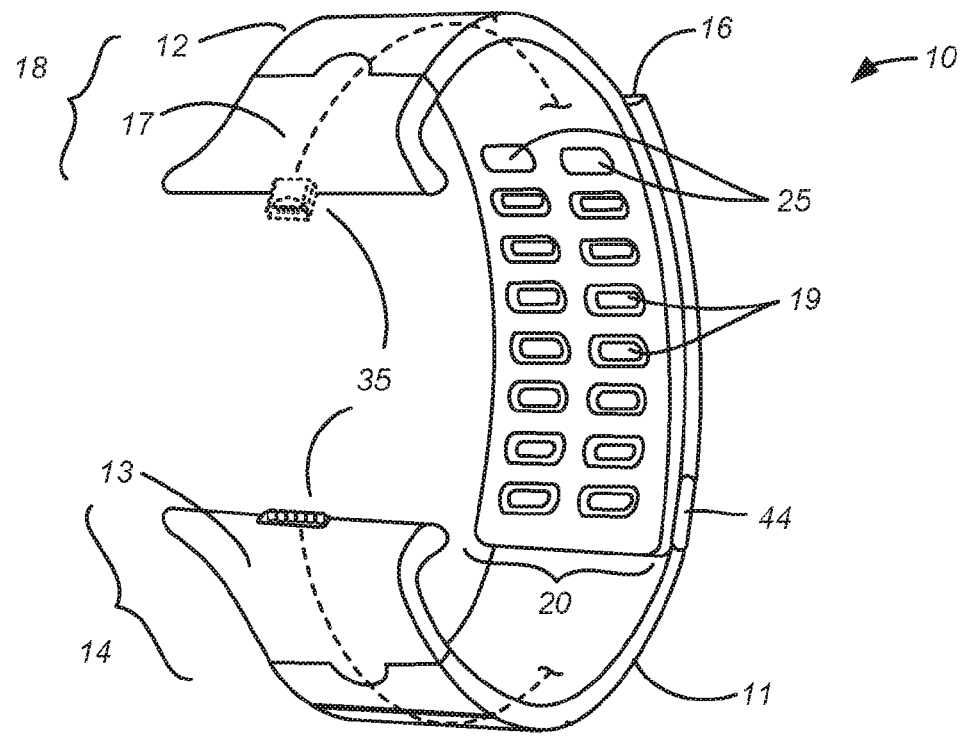
FIG. 19-A
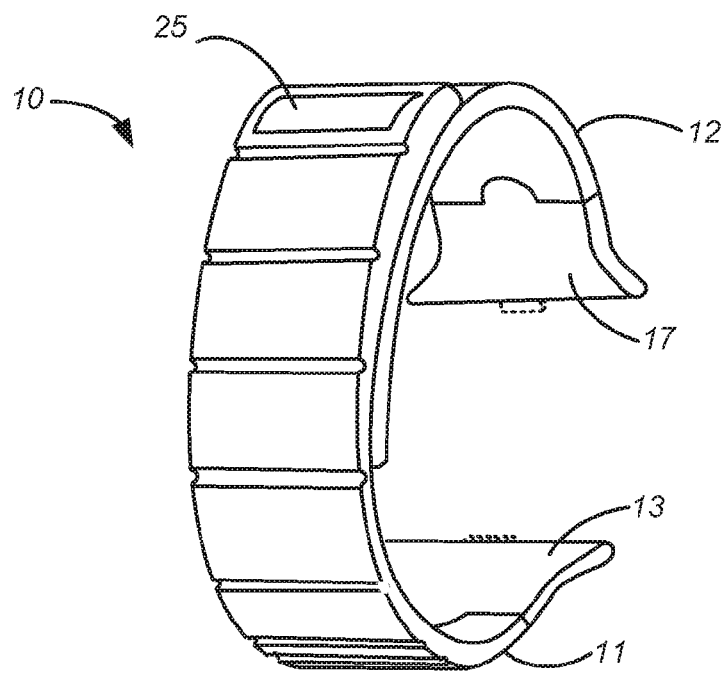
FIG. 19-B

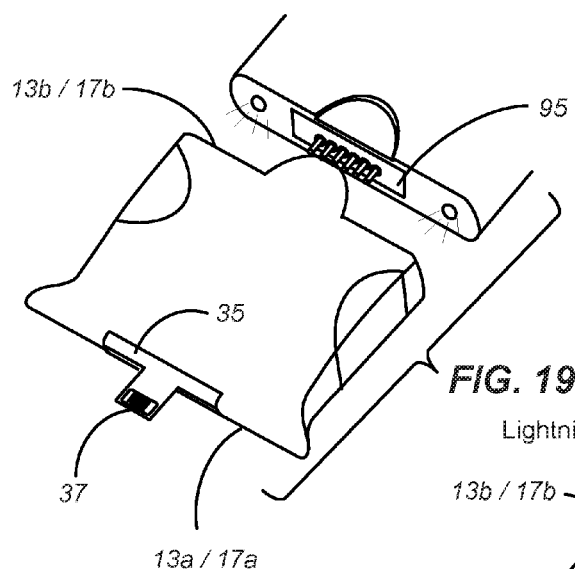
FIG. 19-C
Lightning
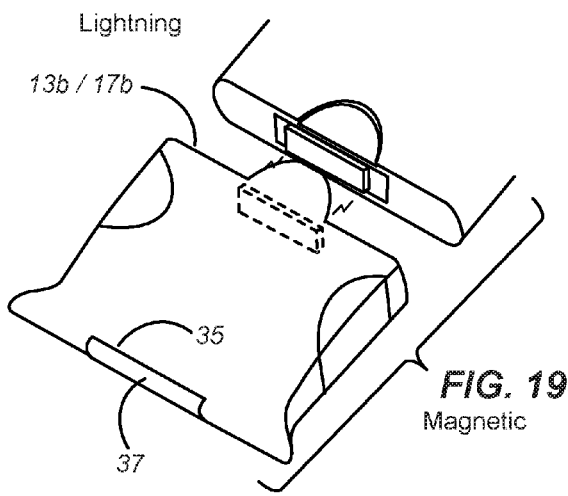
FIG. 19-D
Magnetic
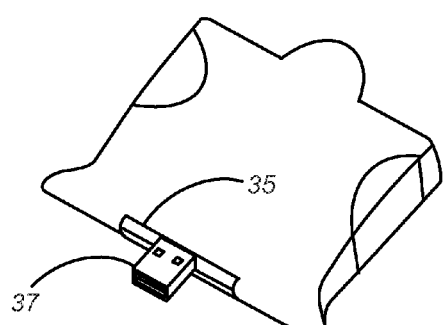
FIG. 19-E
USB
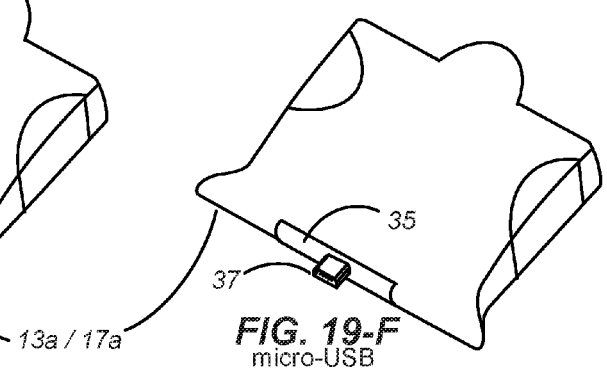
FIG. 19-F
micro-USB

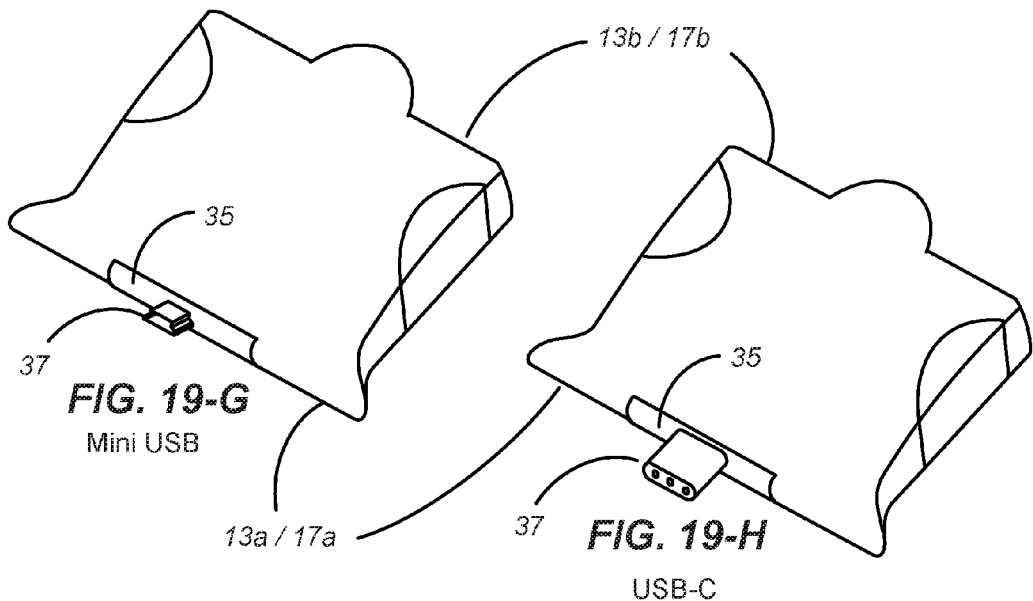
FIG. 19-G
Mini USB
FIG. 19-H
USB-C
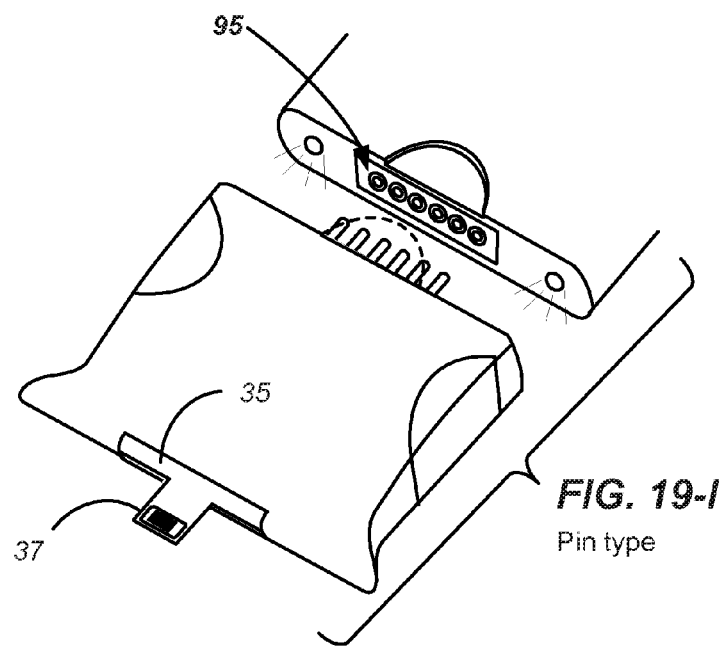
FIG. 19-I
Pin type

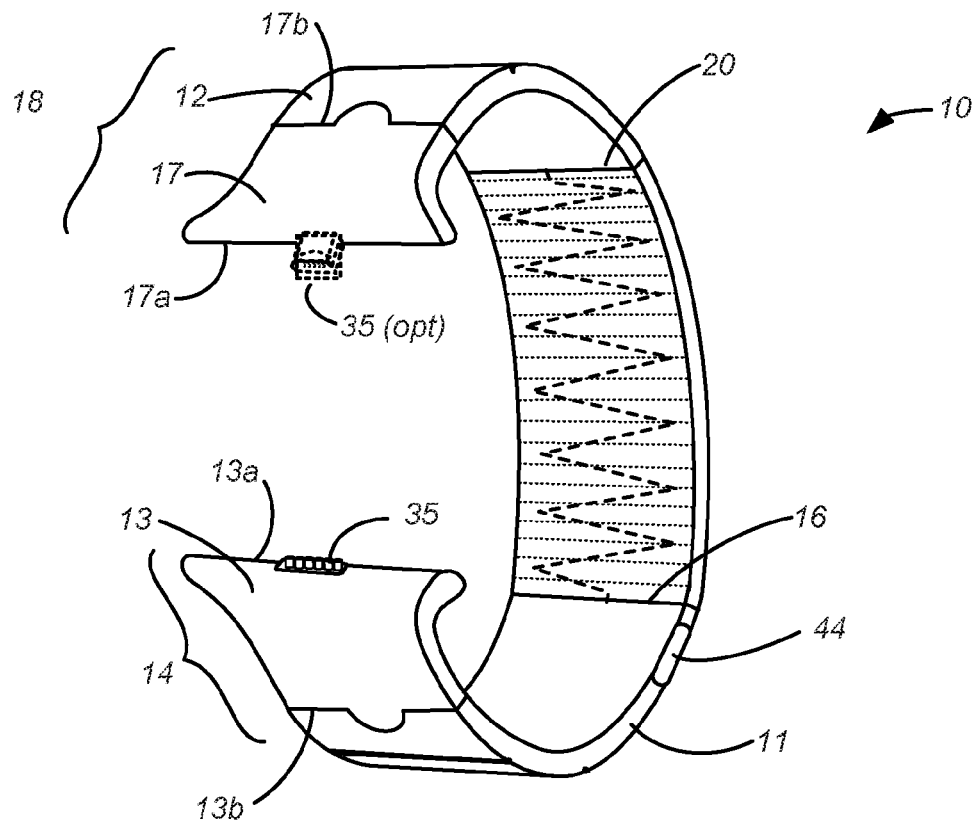
FIG. 20-A
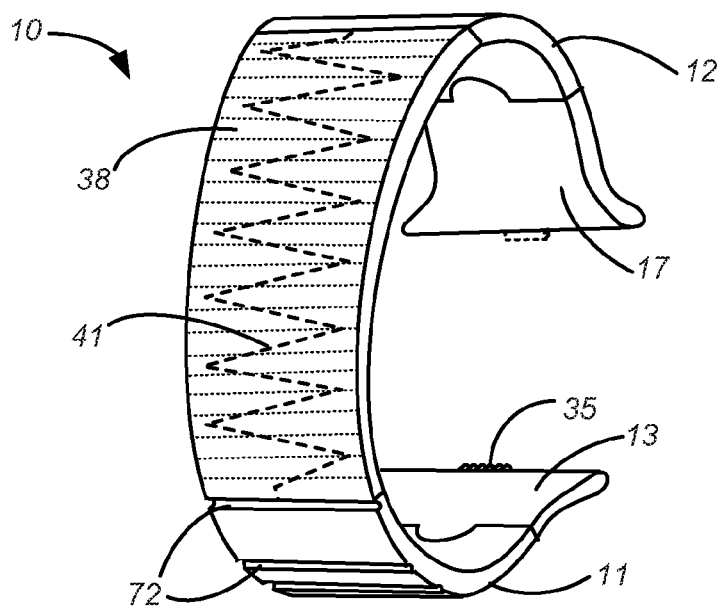
FIG. 20-B

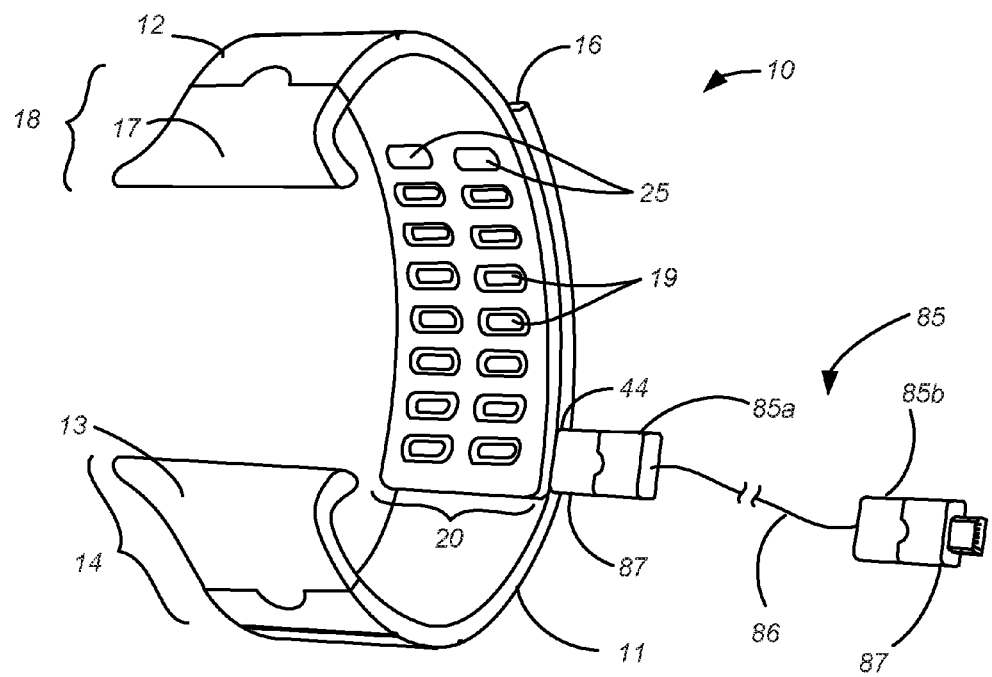
FIG. 21-A
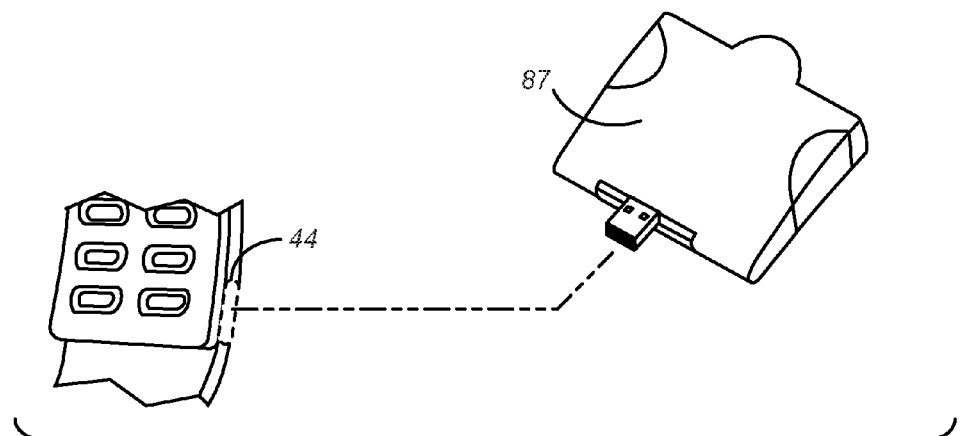
FIG. 21-B
USB

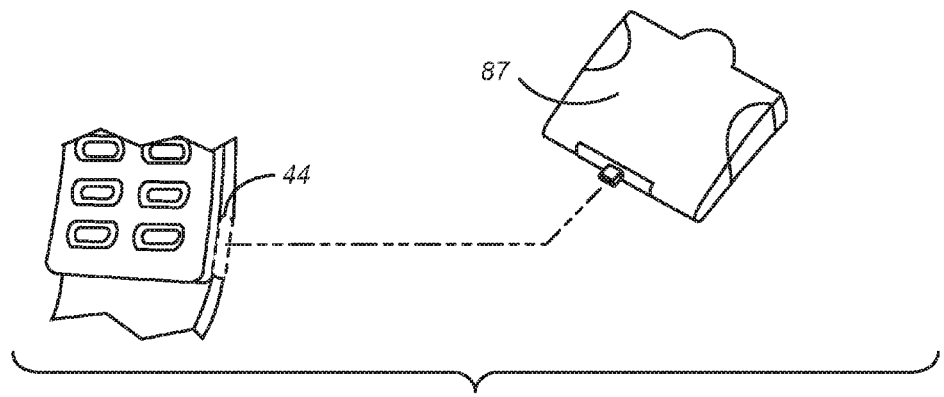
FIG. 21-C
micro-USB
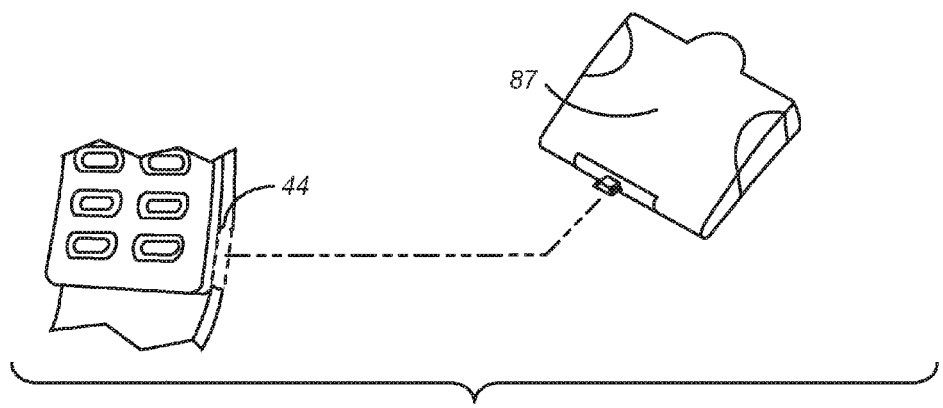
FIG. 21-D
Mini USB
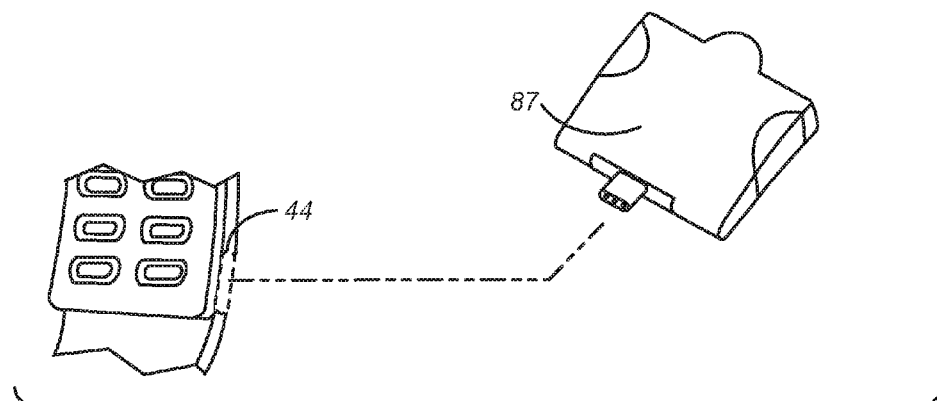
FIG. 21-E
USB-C

FLEXIBLE UNITARY CHARGING BAND SYSTEM

CROSS-REFERENCES TO RELATED APPLICATIONS

The present application claims priority to U.S. Provisional Patent Application No. 62/269,472, filed Dec. 18, 2015 and U.S. Provisional Patent Application No. 62/329,789, filed Apr. 29, 2016, which applications are incorporated herein by reference.

BACKGROUND OF THE INVENTION

Devices such as portable electronic devices have become smaller and more complex in recent years while making significant advances in their capabilities and usefulness. These devices typically include a power source such as a battery disposed within the device itself. While these internal power sources are typically adequate for conventional use, ever-increasing user demand on devices and device capabilities continue to place higher demands for longer battery service life per charging event on those devices.

SUMMARY OF THE INVENTION

Described herein is a band system for a wearable device, or alternately, a flexible smart strap, worn as an article of apparel, for providing reserve power and enhanced functionality to a portable digital device. The band system or smart strap provides both a stylish fashion accessory and a functional rechargeable secondary power source to address an increasing demand for additional battery life due to greater digital demands and functionality of digital smart devices and optionally includes an interchangeable detachable strap with integrated rechargeable batteries, a charging circuit that integrates with a digital device, an interface for recharging the smart strap batteries or a connected portable digital device battery in combination with the smart strap batteries. An additional interface is also described, capable of providing further functionality for various types of data transfer.

Provided herein is a smart strap comprising a first part and a second part, wherein the first part comprises a first section and a second section, and wherein the second part comprises a third section and a fourth section; a first strap attachment interface on the first section configured to connect with a first device attachment interface of a portable digital device; a second strap attachment interface on the third section configured to connect with a second device attachment interface of the portable digital device; a strap connector comprising a first strap connection interface at the second section configured to detachably connect with a second strap connection interface at the fourth section; and a rechargeable battery; wherein the first strap attachment interface or the second strap attachment interface comprises a conductive charging interface operably linked to the rechargeable battery through a battery circuit whereby when an interface port or charging port of the portable digital device is connected to the conductive charging interface, the rechargeable battery charges the portable digital device. In some embodiments, the battery circuit further comprises a printed circuit board. In some embodiments, the printed circuit board further comprises a microcontroller configured to sense the voltage level of the rechargeable battery and the presence or absence of power from an external USB port; a switch circuit configured to apply or remove (5V) power to or from the portable digital device; a boost circuit configured to convert (3.1 V-4.2 V) a low power level from the rechargeable (Lithium-Ion) batteries to (5V) a greater system power, (up to 1 Amp); a power management circuit configured to detect the absence or presence of external (5V) power from the USB port and, based on this detection and the voltage level of the battery, supplies power to the boost circuit either from the external (5V) USB port or the rechargeable batteries; a printed circuit board connector configured to provide an electrical interface between the smart strap and a multi-pin, (such as 6-pin) accessory port on the portable digital device; a LED configured to indicate the current operating state of the smart strap; and a lightning BUS configured to exchange a digital handshake between the portable digital device and the smart strap to enable a charging circuit on the portable digital device. In some embodiments, the microcontroller further comprises: an on-board memory; and a computer implemented system for automated control of the battery circuit comprising; a) a digital processing device comprising an operating system configured to perform executable instructions; b) a computer program including instructions executable by the digital processing device to create an application comprising; i.) a software module configured to manage the switch circuit of the smart strap; ii.) a software module configured to manage the boost circuit of the smart strap; iii.) a software module configured to manage the memory of the smart strap on the microcontroller; and iv.) a software module configured to manage the power management circuit of the smart strap. In some embodiments, the smart strap further comprises an on/off switch or button operatively connected to the printed circuit board configured to toggle the battery circuit between an activated state (on) and a deactivated state (off). In some embodiments, the conductive charging interface comprises either or both of a male pin, and a female socket. In some embodiments, the smart strap comprises a second rechargeable battery operably coupled to the conductive interface through the battery circuit. In some embodiments, the rechargeable battery and the second rechargeable battery are separated within the smart strap such that when encased within the first part, the first part comprises a flex valley on an external surface of the first part that dips partially between the two batteries in order for the smart strap to flex around a user's wrist. In some embodiments, the strap connector comprises a plurality of second strap connection interfaces, and wherein the first strap connector interface is configured to detachably connect with one or more of the plurality of second strap connection interfaces positioned along the length of the fourth section of the second part. In some embodiments, the first strap comprises a battery cavity that receives the rechargeable battery, and a battery cavity door that cooperates with or is the first strap connector interface to enclose the rechargeable battery within the first strap. In some embodiments, the rechargeable battery is removable and replaceable from within the first strap. In some embodiments, the conductive charging interface comprises a magnetic connection. In some embodiments, the battery circuit is flexible. In some embodiments, the portable digital device comprises one or more of a smart watch, a radio, a phone, a computer, an audio device, and a video device. In some embodiments, the smart strap further comprises an auxiliary interface port configured to provide charging access for the rechargeable battery, wherein the auxiliary interface port is configured to receive a power cord connected to an external power source or the auxiliary interface port comprises one or more of: a USB connection; a micro-USB connection; a mini-USB connection; a USB-C connection; a Lightning® connection; and a Firewire® connection. In some embodiments, the smart strap further comprises an auxiliary interface port configured to provide data transfer capability, wherein the auxiliary interface port is configured to receive a data cord connected to an external auxiliary device and comprises one or more of: a USB connection; a micro-USB connection; a mini-USB connection; a USB-C connection; a Lightning® connection; and a Firewire® connection. In some embodiments, one of the first strap attachment interface or the second strap attachment interface secure to one of the first device attachment interface or the second device attachment interface with a press-fit interface or snap-fit interface. In some embodiments, the press-fit or snap-fit interface further comprises at least one secondary capture mechanism to further secure the press-fit or snap-fit interfaces to prevent unintentional separation of the smart strap from the portable digital device attachment interfaces. In some embodiments, one of the first strap attachment interface and the second strap attachment interface secure to one of the first device attachment interface and the second device attachment interface with a sliding interface. In some embodiments, the rechargeable battery is one of a plurality of rechargeable batteries encased in the first part. In some embodiments, the rechargeable battery is encased within the first part or the second part of the smart strap. In some embodiments, the first part or second part encasing the rechargeable battery comprises an insulation layer or insulating material that shields a user from heat of the rechargeable battery. In some embodiments, when the rechargeable battery is in the first strap, the first strap attachment interface comprises an insulated lug through which connector pins are inserted and which are further configured to connect the portable digital device to the first attachment interface of the first strap. In some embodiments, the smart strap is configured to provide approximately one full battery charge to an internal battery of the portable digital device. In some embodiments, the rechargeable battery is configured to provide multiple charges to the internal battery of the portable digital device. In some embodiments, the rechargeable battery is one of a plurality of rechargeable batteries, wherein at least one of the rechargeable batteries is encased in the first part, and wherein at least one of the rechargeable batteries is encased in the second part. In some embodiments, the rechargeable battery is one of a plurality of rechargeable batteries connected in a series circuitry configuration. In some embodiments, the rechargeable battery is one of a plurality of rechargeable batteries connected in a parallel or parallel-series circuitry configuration. In some embodiments, the rechargeable battery and battery circuit are operatively configured on a flex circuit.

Provided herein is a detachable smart strap for providing reserve power to a portable digital device comprising: a first part and a second part, wherein the first part comprises a first section and a second section, and wherein the second part comprises a third section and a fourth section; a first strap attachment interface on the first section configured to connect with a first device attachment interface of the portable digital device; a second strap attachment interface on the third section configured to connect with a second device attachment interface of the portable digital device; a conductive charging interface operably linked to either the first strap attachment interface or the second strap attachment interface configured to interface with a socket of the portable digital device; an auxiliary capture clasp configured to augment and further secure the strap attachment interface comprising the conductive charging interface and to prevent unintentional separation of the smart strap from the portable digital device attachment interfaces; a strap connector comprising a first strap connection interface at the second section configured to detachably connect with a second strap connection interface at the fourth section; a plurality of separated batteries encased within one or both of the first part or the second part of the smart strap; a plurality of flex valleys on an external surface of the first part and second part that dips partially between the plurality of separated batteries in order for the smart strap to flex around a user's wrist; a battery circuit within said smart strap comprising at least: the conductive charging interface operably linked to the plurality of separated batteries, and an interface port or charging port connected to the conductive charging interface; an on/off switch or button operatively connected to the battery circuit configured to toggle the battery circuit between an activated state (on) and a deactivated state (off); a digital processing device comprising an operating system configured to perform executable instructions and a memory device operably linked to the battery circuit; a computer program including instructions executable by the digital processing device to create an application comprising a software module configured to manage a plurality of charging circuit conditions; a plurality of sensors configured to monitor battery charge parameters comprising; a portable digital device rechargeable battery charge level; a smart strap battery charge level; a rate of battery charge; and a rate of battery discharge; wherein the software module monitors the condition of the batteries of the smart strap and the condition of the rechargeable batteries of the portable digital device, and wherein the software module commands a change in the charging parameters of the portable digital device based at least in part on the power level in an internal battery of the portable digital device, the power level in the battery of the smart strap and input from a user. In some embodiments, the batteries comprise rechargeable batteries, non-rechargeable batteries; and/or disposable batteries; and are removable and replaceable from within the first part of the strap or the second part of the strap.

Provided herein is a smart strap for providing reserve power to a portable digital device comprising: a first part and a second part, wherein the first part comprises a first section and a second section, and wherein the second part comprises a third section and a fourth section; a first strap attachment interface on the first section configured to connect with a first device attachment interface of the portable digital device; a second strap attachment interface on the third section configured to connect with a second device attachment interface of the portable digital device; a strap connector comprising a first strap connection interface at the second section configured to detachably connect with a second strap connection interface at the fourth section; a plurality of rechargeable batteries encased within the first part or the second part comprising an insulation layer or insulating material that shields a user from heat of the rechargeable battery; a flexible battery circuit comprising an on/off switch or button operably connected to the battery circuit configured to toggle the battery circuit between an activated state (on) and a deactivated state (off) encased within said smart strap and operably connected to the rechargeable batteries; a printed circuit board comprising; a microcontroller configured to sense the voltage level of the rechargeable battery and the presence or absence of power from an external USB port; a switch circuit configured to apply or remove (5V) power to or from the portable digital device; a boost circuit configured to convert (3.1 V-4.2 V) a low power level from the rechargeable (Lithium-Ion) batteries to (5V) a greater system power, (up to 1 Amp); a power management circuit configured to detect the absence or presence of external (5V) power from the USB port and, based on this detection and the voltage level of the battery, supplies power to the boost circuit either from the external (5V) USB port or the rechargeable batteries; a printed circuit board connector configured to provide an electrical interface between the smart strap and a multi-pin, (such as 6-pin) accessory port on the portable digital device; a LED configured to indicate the current operating state of the smart strap; and a lightning BUS configured to exchange a digital handshake between the portable digital device and the smart strap to enable a charging circuit on the portable digital device; a computer program including instructions executable by the digital processing device to create an application comprising a software module configured to manage a plurality of charging circuit conditions; a plurality of sensors configured to monitor battery charge parameters comprising: a portable digital device rechargeable battery charge level; a smart strap rechargeable battery charge level; a rate of battery charge; and a rate of battery discharge; wherein the software module monitors the condition of the rechargeable batteries of the smart strap and the condition of the rechargeable batteries of the portable digital device; and wherein the software module commands a change in the charging parameters of the portable digital device based at least in part on the power level in an internal battery of the portable digital device, the power level in the battery of the smart strap and input from a user.

Provided herein is a smart strap for a portable digital device comprising a first part and a second part, wherein the first part comprises a first section and a second section, and wherein the second part comprises a third section and a fourth section; a first strap attachment interface on the first section configured to connect with a first device attachment interface of a portable digital device; a second strap attachment interface on the third section configured to connect with a second device attachment interface of the portable digital device; a strap connector comprising a first strap connection interface at the second section configured to detachably connect with a second strap connection interface at the fourth section; and a disposable battery; wherein the disposable battery is rechargeable; wherein the first strap attachment interface or the second strap attachment interface comprises a conductive charging interface operably linked to the disposable battery through a battery circuit whereby when an interface port or charging port of the portable digital device is connected to the conductive charging interface, the disposable battery charges an internal battery of the portable digital device. In some embodiments, the battery circuit further comprises a printed circuit board. In some embodiments, the printed circuit board further comprises a microcontroller configured to sense the voltage level of the disposable battery and the presence or absence of power from an external USB port; a switch circuit configured to apply (5V) power to the portable digital device; a boost circuit configured to convert (3.1 V-4.2 V) a low power level from the disposable batteries to (5V) a greater system power, (up to 1 Amp); a power management circuit configured to detect the absence or presence of external (5V) power from the external USB port and, based on this detection and the voltage level of the disposable battery, supplies power to the boost circuit either from the external (5V) USB port or the disposable battery; a printed circuit board connector configured to provide an electrical interface between the smart strap and a multi-pin, (such as 6-pin) accessory port on the portable digital device; a LED configured to indicate the current operating state of the smart strap; and a lightning BUS configured to exchange a digital handshake between the portable digital device and the smart strap to enable a charging circuit on the portable digital device. In some embodiments, the microcontroller further comprises: an on-board memory; and a computer implemented system for automated control of the battery circuit comprising; a) a digital processing device comprising an operating system configured to perform executable instructions; b) a computer program including instructions executable by the digital processing device to create an application comprising; i.) a software module configured to manage the switch circuit of the smart strap; ii.) a software module configured to manage the boost circuit of the smart strap; iii.) a software module configured to manage the memory of the smart strap on the microcontroller; and iv.) a software module configured to manage the power management circuit of the smart strap. In some embodiments, the smart strap further comprises an on/off switch or button operatively connected to the printed circuit board configured to toggle the battery circuit between an activated state (on) and a deactivated state (off). In some embodiments, the conductive charging interface comprises either or both of a male pin, and a female socket. In some embodiments, the smart strap comprises a second disposable battery operably coupled to the conductive interface through the battery circuit. In some embodiments, the first disposable battery and the second disposable battery are separated within the smart strap such that when encased within the first part, the first part comprises a flex valley on an external surface of the first part that dips partially between the two batteries in order for the smart strap to flex around a user's wrist.

Provided herein is a smart strap for a portable digital device comprising a first part and a second part, wherein the first part comprises a first section and a second section, and wherein the second part comprises a third section and a fourth section; a first strap attachment interface on the first section configured to connect with a first device attachment interface of a portable digital device; a second strap attachment interface on the third section configured to connect with a second device attachment interface of the portable digital device; a strap connector comprising a first strap connection interface at the second section configured to detachably connect with a second strap connection interface at the fourth section; and a disposable and non-rechargeable battery; wherein the first strap attachment interface or the second strap attachment interface comprises a conductive charging interface operably linked to the disposable and non-rechargeable battery through a battery circuit whereby when an interface port or charging port of the portable digital device is connected to the conductive charging interface, the disposable and non-rechargeable battery charges an internal rechargeable battery of the portable digital device. In some embodiments, the battery circuit further comprises a printed circuit board. In some embodiments, the printed circuit board further comprises a microcontroller configured to sense the voltage level of the disposable and non-rechargeable battery and the presence or absence of power from an external USB port; a switch circuit configured to apply (5V) power to the portable digital device; a boost circuit configured to convert (3.1 V-4.2 V) a low power level from the disposable and non-rechargeable batteries to (5V) a greater system power, (up to 1 Amp); a power management circuit configured to detect the absence or presence of external (5V) power from the external USB port and, based on this detection and the voltage level of the disposable and non-rechargeable batteries, supplies power to the boost circuit either from the external (5V) USB port or the disposable and non-rechargeable batteries; a printed circuit board connector configured to provide an electrical interface between the smart strap and a multi-pin, (such as 6-pin) accessory port on the portable digital device; a LED configured to indicate the current operating state of the smart strap; and a lightning BUS configured to exchange a digital handshake between the portable digital device and the smart strap to enable a charging circuit on the portable digital device. In some embodiments, the microcontroller further comprises: an on-board memory; and a computer implemented system for automated control of the battery circuit comprising; a) a digital processing device comprising an operating system configured to perform executable instructions; b) a computer program including instructions executable by the digital processing device to create an application comprising; i.) a software module configured to manage the switch circuit of the smart strap; ii.) a software module configured to manage the boost circuit of the smart strap; iii.) a software module configured to manage the memory of the smart strap on the microcontroller; and iv.) a software module configured to manage the power management circuit of the smart strap. In some embodiments, the smart strap further comprises an on/off switch or button operatively connected to the printed circuit board configured to toggle the battery circuit between an activated state (on) and a deactivated state (off). In some embodiments, the conductive charging interface comprises either or both of a male pin, and a female socket. In some embodiments, the smart strap comprises a second disposable and non-rechargeable battery operably coupled to the conductive interface through the battery circuit. In some embodiments, the first disposable and non-rechargeable battery and the second disposable and non-rechargeable battery are separated within the smart strap such that when encased within the first part, the first part comprises a flex valley on an external surface of the first part that dips partially between the two batteries in order for the smart strap to flex around a user's wrist. In some embodiments, the strap connector comprises a plurality of second strap connection interfaces, and wherein the first strap connector interface is configured to detachably connect with one or more of the plurality of second strap connection interfaces positioned along the length of the fourth section of the second part. In some embodiments, the first strap comprises a battery cavity that receives the disposable and non-rechargeable battery, and a battery cavity door that cooperates with or is the first strap connector interface to enclose the disposable and non-rechargeable battery within the first strap. In some embodiments, the disposable and non-rechargeable battery is removable and replaceable from within the first strap. In some embodiments, the conductive charging interface comprises a magnetic connection. In some embodiments, the battery circuit is flexible. In some embodiments, the portable digital device comprises one or more of a smart watch, a radio, a phone, a computer, an audio device, and a video device. In some embodiments, the smart strap further comprises an auxiliary interface port configured to provide data transfer capability, wherein the auxiliary interface port is configured to receive a cord connected to an external auxiliary device and comprises one or more of: a USB connection; a micro-USB connection; a mini-USB connection; a USB-C connection; a Lightning® connection; and a Firewire® connection. In some embodiments, one of the first strap attachment interface or the second strap attachment interface secure to one of the first device attachment interface or the second device attachment interface with a press-fit interface or snap-fit interface. In some embodiments, the press-fit or snap-fit interface further comprises at least one secondary capture mechanism to further secure the press-fit or snap-fit interfaces to prevent unintentional separation of the smart strap from the portable digital device attachment interfaces. In some embodiments, one of the first strap attachment interface and the second strap attachment interface secure to one of the first device attachment interface and the second device attachment interface with a sliding interface. In some embodiments, the disposable and non-rechargeable battery is one of a plurality of disposable and non-rechargeable batteries encased in the first part of the smart strap. In some embodiments, when the disposable and non-rechargeable battery is in the first part of the strap, the first strap attachment interface comprises an insulated lug through which connector pins are inserted which are configured to connect the portable digital device to the first attachment interface of the first strap. In some embodiments, the disposable and non-rechargeable battery is encased within the first part or the second part of the smart strap. In some embodiments, the disposable and non-rechargeable battery is one of a plurality of disposable and non-rechargeable batteries encased in the first part and/or the second part of the smart strap. In some embodiments, the first part and/or second part encasing the disposable and non-rechargeable battery comprises an insulation layer or insulating material that shields a user from heat of the disposable and non-rechargeable battery. In any one of the embodiments described herein, the disposable and non-rechargeable battery is configured to provide approximately one full battery charge to an internal battery of the portable digital device. In any one of the embodiments described herein, the disposable and non-rechargeable battery is configured to provide multiple charges to an internal battery of the portable digital device. In some embodiments, the disposable and non-rechargeable battery is one of a plurality of disposable and non-rechargeable batteries, wherein at least one of the disposable and non-rechargeable batteries is encased in the first part, and wherein at least one of the disposable and non-rechargeable batteries is encased in the second part. In some embodiments, the disposable and non-rechargeable battery is one of a plurality of disposable and non-rechargeable batteries connected in a series circuitry configuration. In some embodiments, the disposable and non-rechargeable battery is one of a plurality of disposable and non-rechargeable batteries connected in a parallel or parallel-series circuitry configuration. In some embodiments, the disposable and non-rechargeable battery and battery circuit are operatively configured on a flex circuit.

Provided herein is a smart strap comprising a first part and a second part; the first part comprising a first end and a second end; and the second part comprising a third end and a fourth end; a first strap attachment interface on the first end of the first part of said strap configured to connect with a first device attachment interface of a portable digital device; a first strap connector interface positioned about the second end of the first part of said strap configured to connect with a plurality of second strap connection interfaces positioned along the length of the second part of said strap; a second strap attachment interface on the third end of the second part of said strap configured to connect with a second device attachment interface of the portable digital device; at least one rechargeable battery; a battery circuit and a conductive charging interface located within one of the strap attachment interfaces; wherein the at least one rechargeable battery, the battery circuit and conductive charging interface are operatively connected and the conductive charging interface is configured to interface through an interface port of the portable digital device. In some embodiments of the smart strap, the battery circuit further comprises a printed circuit board. In some embodiments of the smart strap, the conductive charging interface comprises a male multi-pin connection interface comprising at least one male pin. In some embodiments of the smart strap, the conductive charging interface comprises a male single pin connection interface. In some embodiments of the smart strap, the conductive charging interface comprises a magnetic connection. In some embodiments of the smart strap, the conductive charging interface comprises a mechanical attachment means. In some embodiments of the smart strap, the conductive interface is also configured to have a data connection. In some embodiments of the smart strap, the conductive charging interface comprises a multi-pin connection interface comprising a male and/or a female pin connection. In some embodiments of the smart strap, the battery circuit is flexible. In some embodiments, the smart strap is configured to supply battery power to the portable digital device. In some embodiments, the smart strap is configured to be worn as an article of apparel. In some embodiments of the smart strap, the portable digital device comprises one or more of a smart watch, a radio, a phone, a computer, an audio device, and a video device. In some embodiments, the smart strap comprising the at least one rechargeable battery is flexible. In some embodiments, the smart strap further comprises an on/off button operatively connected to the printed circuit board. In some embodiments, the smart strap further comprises an on/off button for the communication of data from sensors or other inputs to the portable digital device. In some embodiments, the smart strap further comprises an auxiliary interface port configured to interface with the battery circuit. In some embodiments of the smart strap, the printed circuit board comprises a microcontroller, a switch circuit, a boost circuit, a power management circuit, a multi-pin printed circuit board connector, and an LED. In some embodiments of the smart strap, the printed circuit board comprises a lighting BUS. In some embodiments of the smart strap, the printed circuit board comprises a Lightning BUS. In some embodiments of the smart strap, the battery circuit comprises a Lightning BUS or connection. In some embodiments of the smart strap, one of the first strap attachment interface and/or the second strap attachment interface secure to one of the first device attachment interface and/or the second device attachment interface with a press-fit or snap-fit interface. In some embodiments, the press-fit or snap-fit interface further comprises at least one secondary capture mechanism to further secure the press-fit or snap-fit interfaces to prevent unintentional separation of the smart strap from the portable digital device attachment interfaces. In some embodiments of the smart strap, the at least one secondary capture mechanism comprises a clasp. In some embodiments of the smart strap, the at least one secondary capture mechanism comprises a spring clip. In some embodiments of the smart strap, one of the first strap attachment interface and/or the second strap attachment interface secure to one of the first device attachment interface and/or the second device attachment interface by means of a sliding interface. In some embodiments of the smart strap, the first strap attachment interface of the first part of the smart strap and the second strap attachment interface of the second part of the smart strap are interchangeable with either the first device attachment interface of the portable digital device or the second device attachment interface of the portable digital device. In some embodiments of the smart strap, the at least one male pin of the pin connection interface is retractable. In some embodiments of the smart strap, the first strap connector interface on the second end of the strap comprises a closure door for an internal battery compartment. In some embodiments of the smart strap, the first strap connector interface on the second end of the strap comprises a clasp for attachment to one or more of the plurality of the second strap connection interfaces positioned along the length of the second part of said strap. In some embodiments of the smart strap, the at least one rechargeable battery encased within said smart strap is configured to provide at least a partial charge to an internal battery of the portable digital device to which it is configured to connect. In some embodiments of the smart strap, the at least one rechargeable battery encased within said smart strap is configured to provide approximately one full charge to an internal battery of the portable digital device to which it is configured to connect. In some embodiments of the smart strap, the at least one rechargeable battery encased within said smart strap is configured to provide at least one full charge to an internal battery of the portable digital device to which it is configured to connect. In some embodiments of the smart strap, the at least one rechargeable battery encased within said smart strap is configured to provide multiple charges to an internal battery of the portable digital device to which it is configured to connect. In some embodiments, the rechargeable battery is one of a plurality of rechargeable batteries encased in the first part of the smart strap. In some embodiments of the smart strap, the at least one rechargeable battery encased within said smart strap is configured to reside within the first part or the second part of the smart strap. In some embodiments of the smart strap comprising a plurality of batteries, one or more rechargeable batteries are configured to reside within the first part, and one or more rechargeable batteries are configured to reside within the second part. In some embodiments of the smart strap, the at least one rechargeable battery encased within said smart strap comprises a plurality of batteries, wherein more than one rechargeable battery is configured to reside within the first part, and wherein one or more rechargeable batteries are configured to reside within the second part. In some embodiments of the smart strap, the smart strap is configured with a plurality of batteries connected in a series circuitry configuration. In some embodiments of the smart strap, the at least one rechargeable battery is a Lithium polymer cell. In some embodiments of the smart strap, the at least one rechargeable battery and battery circuit are operatively configured on a flex circuit. In some embodiments of the smart strap, the battery circuit is a flex circuit. In some embodiments of the smart strap, the at least one rechargeable battery and battery circuit are operatively configured on a wired circuit. In some embodiments of the smart strap, the battery circuit is a wired circuit. In some embodiments of the smart strap, the conductive charging interface comprises a plurality of spring-loaded conductive connector pins and an insulated lug integrated with a flex circuit wherein said connector pins are inserted through the insulated lug in the first strap attachment interface. In some embodiments of the smart strap, the conductive charging interface comprises a plurality of conductive connector pins integrated with a flex circuit, and wherein said connector pins are inserted through of an insulated lug in a strap attachment interface. In some embodiments of the smart strap, the portable digital device is a radio. In some embodiments of the smart strap, the portable digital device is a digital phone. In some embodiments of the smart strap, the portable digital device is a computer. In some embodiments of the smart strap, the portable digital device is an audio device. In some embodiments of the smart strap, the portable digital device is a video device. In some embodiments of the smart strap, the portable digital device is any combination of devices comprising: a smart watch; a radio; a phone; a computer; an audio device; and a video device. In some embodiments of the smart strap, the at least one rechargeable battery comprises a non-flat (curved) shaped. In some embodiments of the smart strap, the at least one rechargeable battery comprises a prismatic structure. In some embodiments of the smart strap, the conductive charging interface comprises a female connection interface. In some embodiments of the smart strap, the conductive charging interface is configured to provide additional power to an existing power source of the portable digital device. In some embodiments of the smart strap, the conductive charging interface is configured to interface with a port of the portable digital device. In some embodiments of the smart strap, the on/off button activates and deactivates the battery circuit. In some embodiments of the smart strap, the auxiliary interface port of the smart strap is configured to receive a power cord connected to an external power source. In some embodiments of the smart strap, the auxiliary interface port comprises: a USB connection; a micro-USB connection; a mini-USB connection; a USB-C connection; a Lightning® connection; and a FireWire® connection; wherein the connection of the auxiliary interface port is configured to provide a charging access port for the at least one rechargeable battery of the smart strap. In some embodiments of the smart strap, the battery circuit is configured to determine a charge state of a power source in the portable digital device and provide power from the smart strap to prolong the available charge state of the power source in the portable digital device. In some embodiments of the smart strap, the battery circuit is configured to simultaneously share power received from an auxiliary interface port between the at least one rechargeable battery of smart strap and the power source of the portable digital device. In some embodiments of the smart strap, a microcontroller with on-board memory further comprises a computer implemented system for automated control of the battery circuit comprising: a digital processing device comprising an operating system configured to perform executable instructions and a memory; a computer program including instructions executable by the digital processing device to create an application comprising: a software module configured to manage the switch circuit of the smart strap; a software module configured to manage the boost circuit of the smart strap; a software module configured to manage the memory of the smart strap located on the microcontroller; and a software module configured to manage the power management circuit of the smart strap. In some embodiments of the smart strap, the first strap connector interface on the second end of the strap is configured to provide a conductive attachment interface for attachment to one or more of a plurality of conductive attachment interfaces positioned along the second part of the strap and wherein the plurality of conductive attachment interfaces are connected to at least one battery in the second part of the strap, wherein power from the at least one rechargeable battery encased within the first part of the strap is optionally shared in series with at least one rechargeable battery encased within the second part of the strap. In some embodiments of the smart strap, both the first and second strap attachment interfaces of the smart strap comprise a conductive charging interface configured to interface with an interface port located within one or more of the device attachment interfaces of the portable digital device. In some embodiments of the smart strap, the at least one rechargeable battery and the battery circuit encased within said smart strap are configured to harvest energy for recharging said at least one rechargeable battery from at least one of multiple sources comprising: a chemical power source; a solar power source; a kinetic power source; a magnetic power source; a piezoelectric power source; an external electric power source and a thermal power source. In some embodiments, the smart strap further comprises a backing member located between and beneath the two attachment interfaces. In some embodiments, the backing member is detachable.

Provided herein is a smart strap for providing reserve power to a portable digital device comprising at least a first end and a second end, wherein at least one of the first end or second end comprises an attachment interface for connecting the smart strap to said portable device; a plurality of rechargeable batteries encased within the smart strap; a battery circuit encased within said smart strap operatively connected to said rechargeable batteries; a digital processing device comprising an operating system configured to perform executable instructions and a memory device; a computer program including instructions executable by the digital processing device to create an application comprising a software module configured to manage a plurality of charging circuit conditions; a plurality of sensors configured to monitor battery charge parameters comprising: a portable digital device rechargeable battery charge level, a smart strap rechargeable battery charge level, a rate of battery charge, and a rate of battery discharge; wherein the software module monitors the condition of the rechargeable batteries of the smart strap and the condition of the rechargeable batteries of the portable digital device; wherein the software module commands a change in the charging parameters of the portable digital device based at least in part on the power level in the battery of the portable digital device, the power level in the battery of the smart strap and input from a user; and wherein the smart strap is configured to be worn as an article of apparel. In some embodiments of the smart strap, the software module assists the portable digital device in determining where to draw power. In some embodiments of the smart strap, the rechargeable batteries and battery circuit are operatively connected to a conductive charging interface located within one of the strap attachment interfaces, wherein the conductive charging interface is configured to interface through an interface port of the portable digital device. In some embodiments of the smart strap, the rechargeable batteries, the battery circuit and conductive charging interface are configured to be removable from the smart strap. In any one of the embodiments described herein, the smart strap described herein is configured for use as an article of apparel. In some embodiments, the smart strap is configured to be worn as an article of apparel about the wrist of a person. Still further, in some embodiments, the smart strap as described in any one of the embodiments herein is configured for use as an article of clothing, jewelry, footwear or headwear. In some embodiments, the smart strap further comprises a backing member located between and beneath the two attachment interfaces. In some embodiments, the backing member is detachable.

Provided herein is a method of providing a smart strap, as described in any one of the embodiments herein, as an article of apparel.

Provided herein is a smart strap for providing reserve power to a portable digital device comprising: at least a first end and a second end, each end configured with at least one attachment feature for securing the strap ends to one another; two attachment interfaces for connecting the smart strap to said portable device; a plurality of rechargeable batteries encased within the smart strap; a battery circuit encased within said smart strap configured to operatively connect to said rechargeable batteries; a digital processing device comprising an operating system configured to perform executable instructions and a memory device; a computer program including instructions executable by the digital processing device to create an application comprising a software module configured to manage a plurality of charging circuit conditions; a plurality of sensors configured to monitor battery charge parameters comprising: a portable digital device rechargeable battery charge level, a smart strap rechargeable battery charge level, a rate of battery charge, and a rate of battery discharge; wherein the software module monitors the condition of the rechargeable batteries of the smart strap and the condition of the rechargeable batteries of the portable digital device; and wherein the software module commands a change in the charging parameters of the portable digital device based at least in part on the power level in the battery of the portable digital device, the power level in the battery of the smart strap and input from a user. In some embodiments, the smart strap further comprises a backing member between and beneath the two attachment interfaces. In some embodiments, the backing member would further support and/or protect the portable digital device between the attachment interfaces. In some embodiments, the conductive charging interface comprises a male single pin connection interface. In some embodiments, the conductive charging interface comprises a male multi-pin connection interface. In some embodiments, the male pins of the single or multi-pin connection interface are fixed within the strap attachment interface. In some embodiments, the conductive charging interface comprises a magnetic connection. In some embodiments, the conductive charging interface comprises a mechanical attachment means. In some embodiments, the conductive charging interface comprises a plurality of conductive connector pins integrated with a flex circuit, and wherein the connector pins are inserted through an insulated lug in the strap attachment interface. In some embodiments, the conductive charging interface further comprises a data connection. In some embodiments, the smart strap comprises at least one sensor for the acquisition of data to be exchanged between the smart strap and the portable digital device. In some embodiments, the at least one rechargeable battery encased within said smart strap is configured to provide multiple charges to the at least one internal rechargeable battery of the portable digital device to which it is configured to connect. In some embodiments, the on/off button is further configured for communication of data from sensors or other inputs to the portable digital device. In some embodiments of the smart strap, the at least one rechargeable battery encased within said smart strap is configured to provide continuous and unending charging to an internal battery of the portable digital device to which it is configured to connect from power gathered from solar, kinetic, piezoelectric, external electric or thermal sources. In some embodiments of the smart strap, the smart strap is configured with a plurality of batteries connected in a parallel or parallel-series circuitry configuration. In some embodiments of the smart strap, the battery circuit is a wired circuit. In some embodiments of the smart strap, the at least one rechargeable battery and battery circuit are operatively configured on a wired circuit.

Provided herein is a band system for a wearable device, comprising: a first flexible unitary part and a second flexible unitary part; wherein the first flexible unitary part comprises a first section and a second section, and wherein the second flexible unitary part comprises a third section and a fourth section, a first detachable strap attachment interface, having a first end and a second end, the first end affixable to the first section and configured to connect with a first device attachment interface of either a portable digital device or a case for holding the portable digital device; a second detachable strap attachment interface, having a first end and a second end, affixed on the third section configured to connect with a second device attachment interface of either the portable digital device or the case for holding the portable digital device; a strap connector comprising at least a first strap connection interface near the end of the second section configured to detachably connect with at least one second strap connection interface located along the fourth section; a rechargeable battery within the first flexible unitary part or the second flexible unitary part; and a band system charging interface within either the first detachable strap attachment interface or the second detachable strap attachment interface configured to interface with a charging interface of the first device attachment interface of either a portable digital device or a case for holding the portable digital device; wherein the band system charging interface is operably linked to the rechargeable battery through a detachable connection mechanism and a battery circuit. In some embodiments, the first detachable strap attachment interface and the second detachable strap attachment interface, are each provided with an adapter connection interface capable of connecting first detachable strap attachment interface with a mating (male/female) adapter connection interface on the first section of the first flexible unitary part and the second detachable strap attachment interface with a mating (male/female) adapter connection interface on the third section of the second flexible unitary part; wherein the adapter connection interface of the first detachable strap attachment interface and the second detachable strap attachment interface comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection; and wherein the adapter connection interface of the first section of the first flexible unitary part and the third section of the second flexible unitary part comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection. In some embodiments, the band system further comprises: at least a second rechargeable battery within the first flexible unitary part or the second flexible unitary part; wherein the battery circuit optionally bridges the first flexible unitary part and the second flexible unitary part across the strap connector. In some embodiments, the band system charging interface comprises an adapter connection interface capable of interfacing with an adapter connection of a digital device comprising: a magnetic interface connection; a pin-type interface connection; a USB interface connection; a micro-USB interface connection; a mini-USB interface connection; a USB-C interface connection; a Lightning interface connection; and a Firewire interface connection. In some embodiments, the band system further comprises: a plurality of separated batteries encased within one or both of the first flexible unitary part or the second flexible unitary part. In some embodiments, the band system further comprises: a plurality of flex valleys on an external surface of the first flexible unitary part and second flexible unitary part that dip partially between the plurality of separated batteries in order for the band system to flex around a user's wrist. In some embodiments, the band system further comprises: an on/off switch or button operatively connected to the battery circuit configured to toggle the battery circuit between an activated state (on) and a deactivated state (off). In some embodiments, the band system further comprises: a band system battery charging interface; wherein the band system battery charging interface is configured anywhere along an outer edge or exposed outer surface of the first flexible unitary part or the second flexible unitary part. In some embodiments, the band system further comprises: a charging adapter connection having a first end and a second end, each end an interchangeable adapter connection interface; and a flexible wired connection between the first charging adapter connection end and second charging adapter connection end; wherein the interchangeable adapter connection interfaces comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection. In some embodiments, the band system further comprises: a digital processing device comprising an operating system configured to perform executable instructions and a memory device operably linked to the battery circuit; a computer program including instructions executable by the digital processing device to create an application comprising a software module configured to manage a plurality of charging circuit conditions; a plurality of sensors configured to monitor battery charge parameters comprising: a portable digital device rechargeable battery charge level; a band system battery charge level; a rate of battery charge; and a rate of battery discharge; wherein the software module monitors the condition of the batteries of the band system and the condition of the rechargeable batteries of the portable digital device, and wherein the software module commands a change in the charging parameters of the portable digital device based at least in part on the power level in the battery of the portable digital device, the power level in the battery of the band system and input from a user. In some embodiments, the first detachable strap attachment interface and the second detachable strap attachment interface, are each provided with an auxiliary capture clasp mechanism configured to augment and further secure the strap attachment interface to a portable digital device to prevent unintentional separation of the flexible unitary band system from the portable digital device attachment interfaces.

Provided herein is a band system for a wearable device, comprising: a first flexible unitary part, a second flexible unitary part and an elastic part; wherein the first flexible unitary part comprises a first section and a second section, wherein the second flexible unitary part comprises a third section and a fourth section, and wherein the elastic part, comprising a material with resilient elongation properties and further comprising a flexible portion of a battery circuit, is affixed to and adjoins the first flexible unitary part and the second flexible unitary part at or about the ends of the second section and the fourth section, a first detachable strap attachment interface, having a first end and a second end, the first end affixable to the first section and configured to connect with a first device attachment interface of either a portable digital device or a case for holding the portable digital device; a second detachable strap attachment interface, having a first end and a second end, affixed on the third section configured to connect with a second device attachment interface of either the portable digital device or the case for holding the portable digital device; a rechargeable battery within the first flexible unitary part or the second flexible unitary part; and a band system charging interface within either the first detachable strap attachment interface or the second detachable strap attachment interface configured to interface with a charging interface of the first device attachment interface of either a portable digital device or a case for holding the portable digital device; wherein the band system charging interface is operably linked to the rechargeable battery through a detachable connection mechanism and a battery circuit. In some embodiments, the first detachable strap attachment interface and the second detachable strap attachment interface, are each provided with an adapter connection interface capable of connecting first detachable strap attachment interface with a mating (male/female) adapter connection interface on the first section of the first flexible unitary part and the second detachable strap attachment interface with a mating (male/female) adapter connection interface on the third section of the second flexible unitary part; wherein the adapter connection interface of the first detachable strap attachment interface and the second detachable strap attachment interface comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection; and wherein the adapter connection interface of the first section of the first flexible unitary part and the third section of the second flexible unitary part comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection. In some embodiments, the band system further comprises: at least a second rechargeable battery within the first flexible unitary part or the second flexible unitary part; wherein the battery circuit optionally bridges the first flexible unitary part and the second flexible unitary part across the strap connector. In some embodiments, the band system charging interface comprises an adapter connection interface capable of interfacing with an adapter connection of a digital device comprising: a magnetic interface connection; a pin-type interface connection; a USB interface connection; a micro-USB interface connection; a mini-USB interface connection; a USB-C interface connection; a Lightning interface connection; and a Firewire interface connection. In some embodiments, the band system further comprises a plurality of separated batteries encased within one or both of the first flexible unitary part or the second flexible unitary part. In some embodiments, the band system further comprises a plurality of flex valleys on an external surface of the first flexible unitary part and second flexible unitary part that dip partially between the plurality of separated batteries in order for the band system to flex around a user's wrist. In some embodiments, the band system further comprises an on/off switch or button operatively connected to the battery circuit configured to toggle the battery circuit between an activated state (on) and a deactivated state (off). In some embodiments, the band system further comprises: a band system battery charging interface; wherein the band system battery charging interface is configured anywhere along an outer edge or exposed outer surface of the first flexible unitary part or the second flexible unitary part. In some embodiments, the band system further comprises: a charging adapter connection having a first end and a second end, each end having an interchangeable adapter connection interface;

and a flexible wired connection between the first charging adapter connection end and second charging adapter connection end; wherein the interchangeable adapter connection interfaces comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection. In some embodiments, the band system further comprises: a digital processing device comprising an operating system configured to perform executable instructions and a memory device operably linked to the battery circuit; a computer program including instructions executable by the digital processing device to create an application comprising a software module configured to manage a plurality of charging circuit conditions; a plurality of sensors configured to monitor battery charge parameters comprising: a portable digital device rechargeable battery charge level; a band system battery charge level; a rate of battery charge; and a rate of battery discharge; wherein the software module monitors the condition of the batteries of the band system and the condition of the rechargeable batteries of the portable digital device, and wherein the software module commands a change in the charging parameters of the portable digital device based at least in part on the power level in the battery of the portable digital device, the power level in the battery of the band system and input from a user. In some embodiments, the first detachable strap attachment interface and the second detachable strap attachment interface, are each provided with an auxiliary capture clasp mechanism configured to augment and further secure the strap attachment interface to a portable digital device to prevent unintentional separation of the flexible unitary band system from the portable digital device attachment interfaces.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1-A is an illustrative isometric view of a smart strap.

FIG. 1-B is an alternate illustrative isometric view of the smart strap of FIG. 1.

FIG. 4-A is a side view of the smart strap of FIG. 1 with a representative portable digital device attached.

FIG. 4-B is an illustrative detail section view of the inside surface of the strap showing the attachment interfaces and the charging port for the rechargeable batteries in the smart strap of FIG. 1.

FIG. 5-A is an illustrative isometric diagram of a first half of the smart strap of FIG. 1.

FIG. 5-B is an illustrative detail view of the strap attachment interface showing the conductive charging pins on an end of said strap of FIG. 5.

FIG. 7-B is detail section view of the strap attachment interface with the cover removed on an end of said strap of FIG. 7.

FIG. 8 is an illustrative isometric diagram of one version of a second half of the smart strap of FIG. 1.

FIG. 9-A is an illustrative view of another configuration of the outer surface of smart strap showing yet another attachment clasp configuration.

FIG. 9-B is an illustrative view of the inner surface of the smart strap of FIG. 9-A showing a detail assembly of a capture clasp affixed to the attachment interface comprising the pin connector interface.

FIG. 10-A is a side view of the smart strap configuration shown in FIGS. 9-A and 9-B.

FIG. 10-B is a section view of the smart strap configuration shown in FIG. 10-A.

FIG. 10-C is an isometric end view of the smart strap configuration shown in FIG. 9-A.

FIG. 11 is an exploded isometric inferior view of the smart strap configuration shown in FIG. 9 illustrating the attachment clasp and attachment interfaces in an unassembled state.

FIG. 12-A is a detailed side view of the smart strap capture clasp affixed to the attachment interface comprising the pin connector interface shown in FIG. 10-A.

FIG. 12-B is a detailed cross-section of the smart strap capture clasp connection shown in FIG. 12-A.

FIG. 12-C is a detailed bottom view of the smart strap capture clasp affixed to the attachment interface comprising the pin connector interface shown in FIG. 9-A.

FIG. 12-D is an assembly/disassembly tool comprising a customized probe tip utilized in connection with the attachment interface.

FIG. 13-A is an exploded side view of the smart strap capture clasp, the attachment interface comprising the pin connector interface and a representative portable digital device with an attachment interface.

FIG. 13-B is an exploded isometric side view of the smart strap capture clasp, the attachment interface and representative portable digital device shown in FIG. 13-A.

FIG. 14-A is an assembled side view of the smart strap capture clasp and the attachment interface shown in FIG. 13-A, prior to assembly to a representative portable digital device.

FIG. 14-B is an assembled side view of the smart strap and a representative portable digital device.

FIGS. 15-A and 15-B are representative isometric/bottom views of the smart strap of FIG. 10-A and a representative portable digital device.

FIGS. 16-A and 16-B are illustrative front and back isometric views of another alternative embodiment of the smart strap of FIG. 1 with an optional supporting backing member between the attachment ends of the strap that would further support and/or capture a portable digital device between the attachment interfaces.

FIGS. 16-C and 16-D are illustrative side views of the alternative embodiment of the smart strap of FIGS. 16-A and 16-B with an optional supporting backing member between the attachment ends of the strap that would further support and/or capture a portable digital device between the attachment interfaces, as shown.

FIG. 17 is a top view of yet another alternate embodiment of the smart strap of FIG. 1, comprising a 1-Piece strap with a supporting backing member that would further support and/or capture a portable digital device and further illustrating internal rechargeable battery locations (in shadow).

FIGS. 19-A and 19-B are illustrative front and back isometric views of a Unitary Band System with detachable attachment interfaces.

FIG. 19-C is an illustrative isometric views of a detachable Lightning attachment interfaces of the Unitary band System of FIGS. 19-A and 19-B.

FIG. 19-D is an illustrative isometric view of a detachable Magnetic attachment interface of the Unitary band System of FIGS. 19-A and 19-B.

FIG. 19-E is an illustrative isometric view of a detachable USB attachment interface of the Unitary band System of FIGS. 19-A and 19-B.

FIG. 19-F is an illustrative isometric view of a detachable micro-USB attachment interface of the Unitary band System of FIGS. 19-A and 19-B.

FIG. 19-G is an illustrative isometric view of a detachable Mini-USB attachment interface of the Unitary band System of FIGS. 19-A and 19-B.

FIG. 19-H is an illustrative isometric view of a detachable USB-C attachment interface of the Unitary band System of FIGS. 19-A and 19-B.

FIG. 19-I is an illustrative isometric view of a detachable Pin-type attachment interface of the Unitary band System of FIGS. 19-A and 19-B.

FIGS. 20-A and 20-B are illustrative isometric views of another variant of a Unitary Band System with detachable attachment interfaces.

FIG. 21-A is a representative view a Unitary Band System with a battery charging interface and battery charging adapter with interchangeable adapter connection interfaces.

FIG. 21-B is an illustrative isometric views of a USB configuration of the battery charging interface and battery charging adapter with interchangeable adapter connection interfaces illustrated in FIG. 21-A.

FIG. 21-C is an illustrative isometric view of a micro-USB configuration of the battery charging interface and battery charging adapter with interchangeable adapter connection interfaces illustrated in FIG. 21-A.

FIG. 21-D is an illustrative isometric view of a mini-USB configuration of the battery charging interface and battery charging adapter with interchangeable adapter connection interfaces illustrated in FIG. 21-A.

FIG. 21-E is an illustrative isometric view of a USB-C configuration of the battery charging interface and battery charging adapter with interchangeable adapter connection interfaces illustrated in FIG. 21-A.

DETAILED DESCRIPTION OF THE INVENTION

Figure 2:
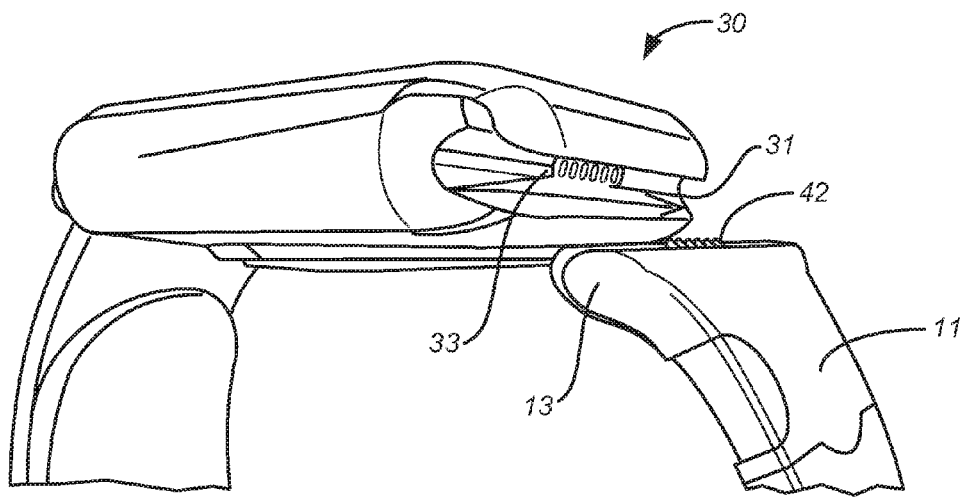
FIG. 2 is an alternate illustrative isometric view of the smart strap of FIG. 1 with a representative portable digital device with an attachment interface.

Provided herein is a band system for a wearable device, or alternately, a flexible smart strap, worn as an article of apparel, for providing reserve power and enhanced functionality to a portable digital device. The band system or smart strap provides both a stylish fashion accessory and a functional rechargeable secondary power source to address an increasing demand for additional battery life due to greater digital demands and functionality of digital smart devices and optionally includes an interchangeable detachable strap with integrated rechargeable batteries, a charging circuit that integrates with a digital device, an interface for recharging the smart strap batteries or a connected portable digital device battery in combination with the smart strap batteries. An additional interface is also described, capable of providing further functionality for various types of data transfer.

Provided herein is a flexible smart strap and method of using said smart strap, worn as an article of apparel, for providing reserve power to a portable digital device, which includes an interchangeable strap with integrated rechargeable batteries, a charging circuit and an auxiliary interface port for recharging the smart strap batteries, or a connected portable digital device battery, in combination with the smart strap batteries.

Provided herein is a smart strap comprising a first part and a second part, wherein the first part comprises a first section and a second section, and wherein the second part comprises a third section and a fourth section; a first strap attachment interface on the first section configured to connect with a first device attachment interface of a portable digital device; a second strap attachment interface on the third section configured to connect with a second device attachment interface of the portable digital device; a strap connector comprising a first strap connection interface at the second section configured to detachably connect with a second strap connection interface at the fourth section; and a rechargeable battery; wherein the first strap attachment interface or the second strap attachment interface comprises a conductive charging interface operably linked to the rechargeable battery through a battery circuit whereby when an interface port or charging port of the portable digital device is connected to the conductive charging interface, the rechargeable battery charges the portable digital device.

In some embodiments, the battery circuit further comprises a printed circuit board. In some embodiments, the printed circuit board further comprises a microcontroller configured to sense the voltage level of the rechargeable battery and the presence or absence of power from an external USB port; a switch circuit configured to apply or remove (5V) power to or from the portable digital device; a boost circuit configured to convert (3.1 V-4.2 V) a low power level from the rechargeable (Lithium-Ion) batteries to (5V) a greater system power, (up to 1 Amp); a power management circuit configured to detect the absence or presence of external (5V) power from the USB port and, based on this detection and the voltage level of the battery, supplies power to the boost circuit either from the external (5V) USB port or the rechargeable batteries; a printed circuit board connector configured to provide an electrical interface between the smart strap and a multi-pin, (such as 6-pin) accessory port on the portable digital device; a LED configured to indicate the current operating state of the smart strap; and a lightning BUS configured to exchange a digital handshake between the portable digital device and the smart strap to enable a charging circuit on the portable digital device.

In some embodiments, the microcontroller further comprises: an on-board memory; and a computer implemented system for automated control of the battery circuit comprising; a) a digital processing device comprising an operating system configured to perform executable instructions; b) a computer program including instructions executable by the digital processing device to create an application comprising; i.) a software module configured to manage the switch circuit of the smart strap; ii.) a software module configured to manage the boost circuit of the smart strap; iii.) a software module configured to manage the memory of the smart strap on the microcontroller; and iv.) a software module configured to manage the power management circuit of the smart strap.

In some embodiments, the smart strap further comprises an on/off switch or button operatively connected to the printed circuit board configured to toggle the battery circuit between an activated state (on) and a deactivated state (off). In some embodiments, the conductive charging interface comprises either or both of a male pin, and a female socket.

In some embodiments, the smart strap comprises a second rechargeable battery operably coupled to the conductive interface through the battery circuit. In some embodiments, the rechargeable battery and the second rechargeable battery are separated within the smart strap such that when encased within the first part, the first part comprises a flex valley on an external surface of the first part that dips partially between the two batteries in order for the smart strap to flex around a user's wrist. In some embodiments, the strap connector comprises a plurality of second strap connection interfaces, and wherein the first strap connector interface is configured to detachably connect with one or more of the plurality of second strap connection interfaces positioned along the length of the fourth section of the second part. In some embodiments, the first strap comprises a battery cavity that receives the rechargeable battery, and a battery cavity door that cooperates with or is the first strap connector interface to enclose the rechargeable battery within the first strap. In some embodiments, the rechargeable battery is removable and replaceable from within the first strap.

In some embodiments, the conductive charging interface comprises a magnetic connection. In some embodiments, the battery circuit is flexible. In some embodiments, the portable digital device comprises one or more of a smart watch, a radio, a phone, a computer, an audio device, and a video device.

In some embodiments, the smart strap further comprises an auxiliary interface port configured to provide charging access for the rechargeable battery, wherein the auxiliary interface port is configured to receive a power cord connected to an external power source or the auxiliary interface port comprises one or more of: a USB connection; a micro-USB connection; a mini-USB connection; a USB-C connection; a Lightning® connection; and a Firewire® connection. In some embodiments, the smart strap further comprises an auxiliary interface port configured to provide data transfer capability, wherein the auxiliary interface port is configured to receive a data cord connected to an external auxiliary device and comprises one or more of: a USB connection; a micro-USB connection; a mini-USB connection; a USB-C connection; a Lightning® connection; and a Firewire® connection.

In some embodiments, one of the first strap attachment interface or the second strap attachment interface secure to one of the first device attachment interface or the second device attachment interface with a press-fit interface or snap-fit interface. In some embodiments, the press-fit or snap-fit interface further comprises at least one secondary capture mechanism to further secure the press-fit or snap-fit interfaces to prevent unintentional separation of the smart strap from the portable digital device attachment interfaces. In some embodiments, one of the first strap attachment interface and the second strap attachment interface secure to one of the first device attachment interface and the second device attachment interface with a sliding interface.

In some embodiments, the rechargeable battery is one of a plurality of rechargeable batteries encased in the first part. In some embodiments, the rechargeable battery is encased within the first part or the second part of the smart strap. In some embodiments, the first part or second part encasing the rechargeable battery comprises an insulation layer or insulating material that shields a user from heat of the rechargeable battery. In some embodiments, wherein the rechargeable battery is in the first strap, the first strap attachment interface comprises an insulated lug through which connector pins are inserted and which are configured to connect to the portable digital device.

In some embodiments, the smart strap is configured to provide approximately one full battery charge to an internal battery of the portable digital device. In some embodiments, the rechargeable battery is configured to provide multiple charges to the internal battery of the portable digital device. In some embodiments, the rechargeable battery is one of a plurality of rechargeable batteries, wherein at least one of the rechargeable batteries is encased in the first part, and wherein at least one of the rechargeable batteries is encased in the second part. In some embodiments, the rechargeable battery is one of a plurality of rechargeable batteries connected in a series circuitry configuration. In some embodiments, the rechargeable battery is one of a plurality of rechargeable batteries connected in a parallel or parallel-series circuitry configuration. In some embodiments, the rechargeable battery and battery circuit are operatively configured on a flex circuit.

Provided herein is a smart strap for providing reserve power to a portable digital device comprising: a first part and a second part, wherein the first part comprises a first section and a second section, and wherein the second part comprises a third section and a fourth section; a first strap attachment interface on the first section configured to connect with a first device attachment interface of the portable digital device; a second strap attachment interface on the third section configured to connect with a second device attachment interface of the portable digital device; a strap connector comprising a first strap connection interface at the second section configured to detachably connect with a second strap connection interface at the fourth section; a plurality of rechargeable batteries encased within the first part or the second part comprising an insulation layer or insulating material that shields a user from heat of the rechargeable battery; a flexible battery circuit comprising an on/off switch or button operably connected to the battery circuit configured to toggle the battery circuit between an activated state (on) and a deactivated state (off) encased within said smart strap and operably connected to the rechargeable batteries; a printed circuit board comprising: a microcontroller configured to sense the voltage level of the rechargeable battery and the presence or absence of power from an external USB port; a switch circuit configured to apply or remove (5V) power to or from the portable digital device; a boost circuit configured to convert (3.1 V-4.2 V) a low power level from the rechargeable (Lithium-Ion) batteries to (5V) a greater system power, (up to 1 Amp); a power management circuit configured to detect the absence or presence of external (5V) power from the USB port and, based on this detection and the voltage level of the battery, supplies power to the boost circuit either from the external (5V) USB port or the rechargeable batteries; a printed circuit board connector configured to provide an electrical interface between the smart strap and a multi-pin, (such as 6-pin) accessory port on the portable digital device; a LED configured to indicate the current operating state of the smart strap; and a lightning BUS configured to exchange a digital handshake between the portable digital device and the smart strap to enable a charging circuit on the portable digital device; a computer program including instructions executable by the digital processing device to create an application comprising a software module configured to manage a plurality of charging circuit conditions; a plurality of sensors configured to monitor battery charge parameters comprising: a portable digital device rechargeable battery charge level; a smart strap rechargeable battery charge level; a rate of battery charge; and a rate of battery discharge; wherein the software module monitors the condition of the rechargeable batteries of the smart strap and the condition of the rechargeable batteries of the portable digital device; and wherein the software module commands a change in the charging parameters of the portable digital device based at least in part on the power level in an internal battery of the portable digital device, the power level in the battery of the smart strap and input from a user.

Provided herein is a smart strap comprising a first part and a second part; the first part comprising a first end and a second end; and the second part comprising a third end and a fourth end; a first strap attachment interface on the first end of the first part of said strap configured to connect with a first device attachment interface of a portable digital device; a first strap connector interface positioned about the second end of the first part of said strap configured to connect with a plurality of second strap connection interfaces positioned along the length of the second part of said strap; a second strap attachment interface on the third end of the second part of said strap configured to connect with a second device attachment interface of the portable digital device; at least one rechargeable battery and a battery circuit encased within said smart strap configured to operatively connect to a conductive charging interface located within one of the strap attachment interfaces; wherein the conductive charging interface is configured to interface through an interface port of the portable digital device.

As used herein, and unless otherwise specified, the term "unitary" comprised of one unit or a unit of a whole and undivided system. In certain embodiments, a system can comprise a number of undivided units, meaning that the essential components of a unitary band or smart strap include the battery, or batteries and the battery circuit encased within the flexible housing of the unitary band or smart strap. Additional components of the undivided system include a connection or interface component to interface with a portable digital device. The interface component can be detachable, but is separate from the essential components of a unitary band or smart strap.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.05 degrees of a given value or range.

In certain embodiments, the term "about" or "approximately" means within 5.0 mA, 1.0 mA, 0.9 mA, 0.8 mA, 0.7 mA, 0.6 mA, 0.5 mA, 0.4 mA, 0.3 mA, 0.2 mA, 0.1 mA, 0.09 mA, 0.08 mA, 0.07 mA, 0.06 mA, 0.05 mA, 0.04 mA, 0.03 mA, 0.02 mA or 0.01 mA of a given value or range.

As used herein, "about" when used in reference to a percentage of something means variation of 1%-5%, of 5%-10%, of 10%-20%, and/or of 10%-50% (as a percent of the percentage of something, or as a variation of the percentage of something). For example, if the percentage of a coating is "about 20%", the percentage optionally varies 5%-10% as a percent of the percentage i.e., from 19% to 21% or from 18% to 22% alternatively the percentage optionally varies 5%-10% as an absolute variation of the percentage i.e. from 15% to 25% or from 10% to 30%.

In certain embodiments, the term "about" or "approximately" means within 0.01 sec., 0.02 sec, 0.03 sec., 0.04 sec., 0.05 sec., 0.06 sec., 0.07 sec., 0.08 sec. 0.09 sec. or 0.10 sec of a given value or range.

Those of skill in the art will recognize that in some embodiments, the various illustrative logical blocks, modules, circuits, and algorithm steps described in connection with the embodiments of the Smart Strap disclosed herein, for example, are implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans will optionally implement the described functionality in varying ways for each particular application, but such implementation decisions should not be interpreted as causing a departure from the scope of the present invention. For example, various illustrative logical blocks, modules, and circuits described in connection with the embodiments disclosed herein are implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor is optionally a microprocessor, but in the alternative, the processor is optionally any conventional processor, controller, microcontroller, or state machine. In some embodiments, a processor will be implemented as a combination of computing devices, e.g., a combination of a DSP and a microprocessor, a plurality of microprocessors, one or more microprocessors in conjunction with a DSP core, or any other such configuration. In some embodiments, software associated with such modules resides in RAM memory, flash memory, ROM memory, EPROM memory, EEPROM memory, registers, a hard disk, a removable disk, a CD-ROM, or any other suitable form of storage medium known in the art. In some embodiments, an exemplary storage medium is coupled to the processor such that the processor reads information from, and writes information to, the storage medium. In alternative embodiments, the storage medium is integral to the processor. In some embodiments, the processor and the storage medium reside in an ASIC. For example, in one embodiment, a controller for use of control of the IVT comprises a processor (not shown).

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Digital Processing Device

In some embodiments, the Smart strap described herein includes a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments the Smart strap disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the smart strap disclosed herein includes at least one computer program, or use of the same. A computer program includes a sequence of instructions, executable in the digital processing device's CPU, written to perform a specified task. Computer readable instructions are optionally implemented as program modules, such as functions, objects, Application Programming Interfaces (APIs), data structures, and the like, that perform particular tasks or implement particular abstract data types. In light of the disclosure provided herein, those of skill in the art will recognize that a computer program is optionally written in various versions of various languages.

The functionality of the computer readable instructions are optionally combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Figure 3:
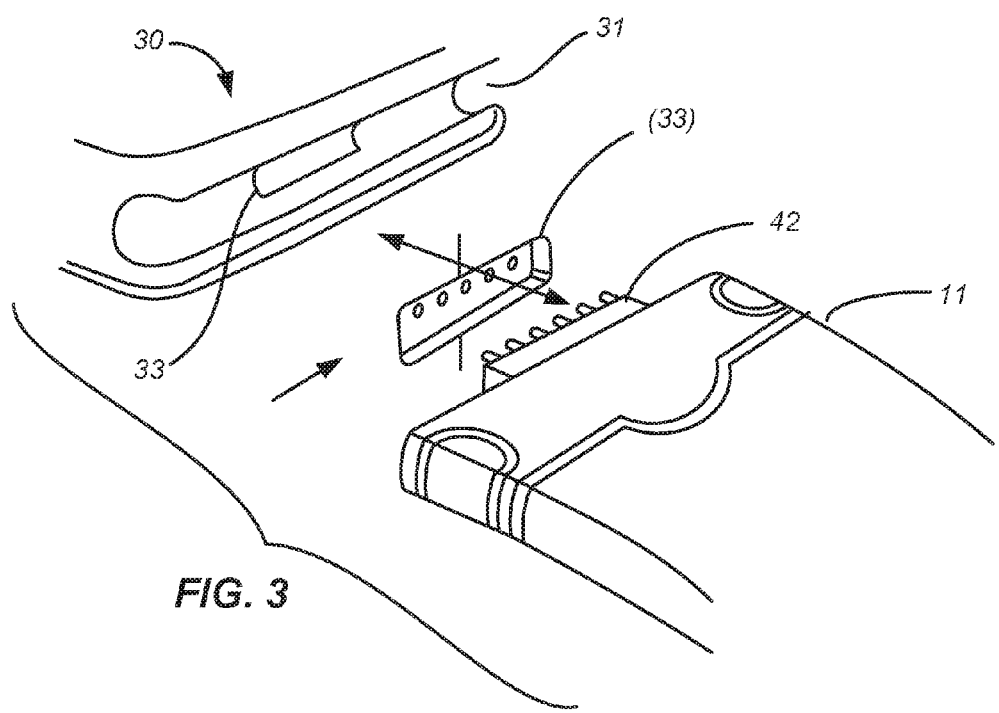
FIG. 3 is an illustrative sketch of the strap attachment interface on an end of said strap of FIG. 3 configured to connect with device attachment interface of a portable digital device showing detailed exploded views of the pin connection interface.
Figure 6:
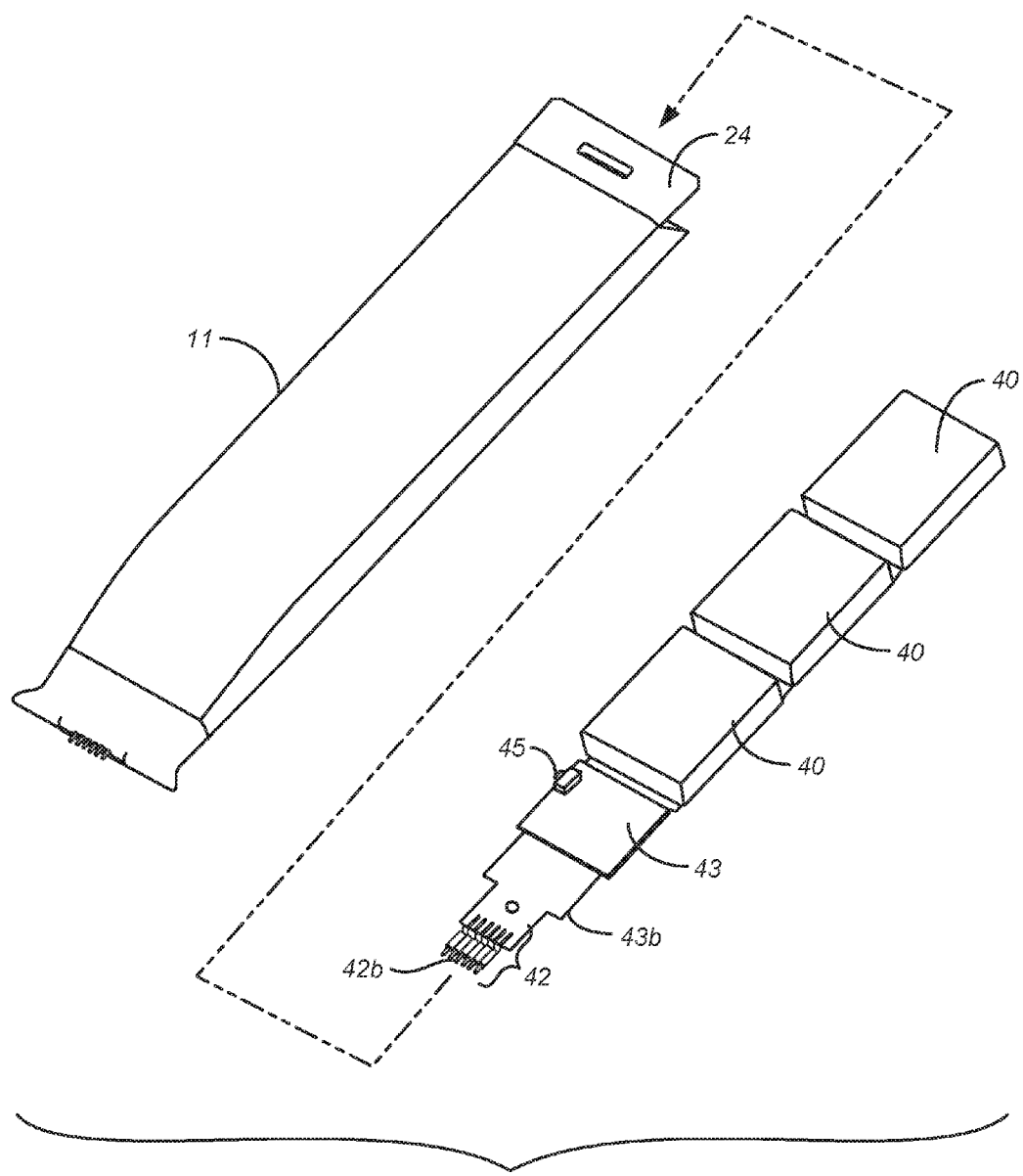
FIG. 6 is an illustrative isometric, exploded diagram of the first half of the smart strap of FIG. 5 with a rechargeable battery, battery circuit and conductive charging pins removed from the smart strap.

Referring now to FIGS. 1 and 1-A, the smart strap 10 comprises a first part 11 and a second part 12, wherein the first part comprises a first end 14 and a second end 16, and wherein the second part 12 comprises a third end 18 and a fourth end 20; a first strap attachment interface 13 on the first end 14 configured to connect with a first device attachment interface 31 of a portable digital device (as shown in FIGS. 2 and 3); a second strap attachment interface 17 on the third end 18 configured to connect with a second device attachment interface 32 of the portable digital device (as shown in FIG. 4); a strap connector 15 comprising a first strap connection interface 25 at the second end 16 configured to detachably connect with a second strap connection interface 19 at the fourth end 20; and a rechargeable battery 40 (as shown in FIG. 6). As should be apparent from the figures, the first strap attachment interface 13 or the second strap attachment interface 17 comprises a conductive charging interface 42 operably linked to the rechargeable battery 40 through a battery circuit 41 whereby when an interface port or charging port 33 of the portable digital device is connected to the conductive charging interface 42, the rechargeable battery 40 charges an internal rechargeable battery (not shown) the portable digital device.

As further illustrated in FIGS. 2, 4-A and 12-A through 15-B, in various embodiments of the smart strap, the first strap attachment interface 13 or the second strap attachment interface 17 secure to one of the first device attachment interface 31 or the second device attachment interface 32 with a press-fit interface or snap-fit interface. In some embodiments, one of the first strap attachment interface 13 and the second strap attachment interface 17 secure to one of the first device attachment interface 31 and the second device attachment interface 32 with a sliding interface. In some embodiments, the sliding interface, the press-fit interface or snap-fit interface further comprises at least one secondary capture mechanism or capture clasp assembly 80 to further secure the sliding, press-fit or snap-fit interfaces to prevent unintentional separation of the smart strap 10 from the portable digital device attachment interfaces 31, 32. In some embodiments, capture clasp assembly 80 comprises a capture clasp 81, held in place by a capture plate 82 and secured to the smart strap by a securing device such as a screw 83, pin, or rivet, to name but a few.

Figure 7:
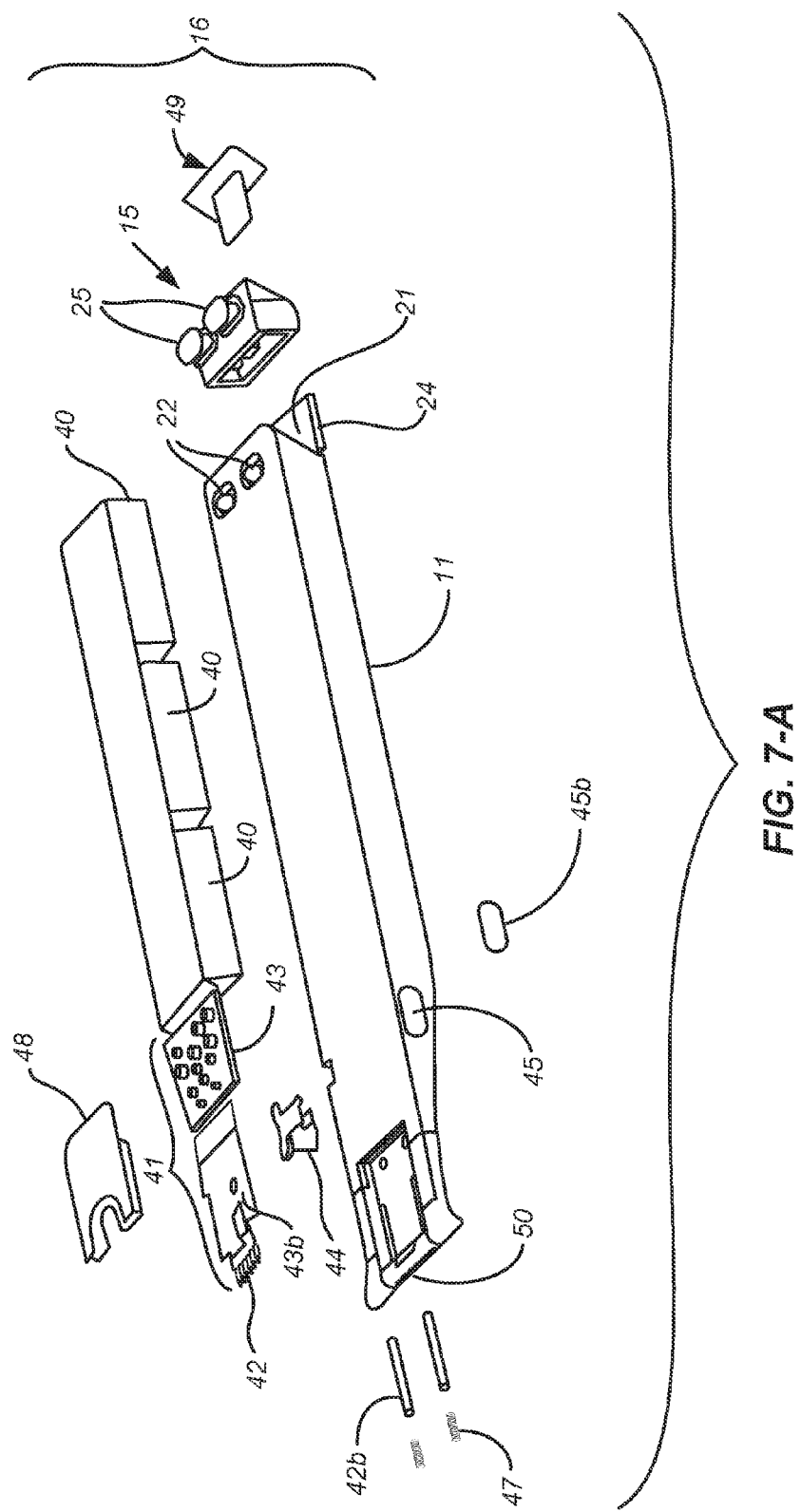
FIG. 7-A is an illustrative isometric, exploded diagram of the first half of the smart strap of FIG. 5 showing the major components of the first half of the smart strap.
Figure 18:
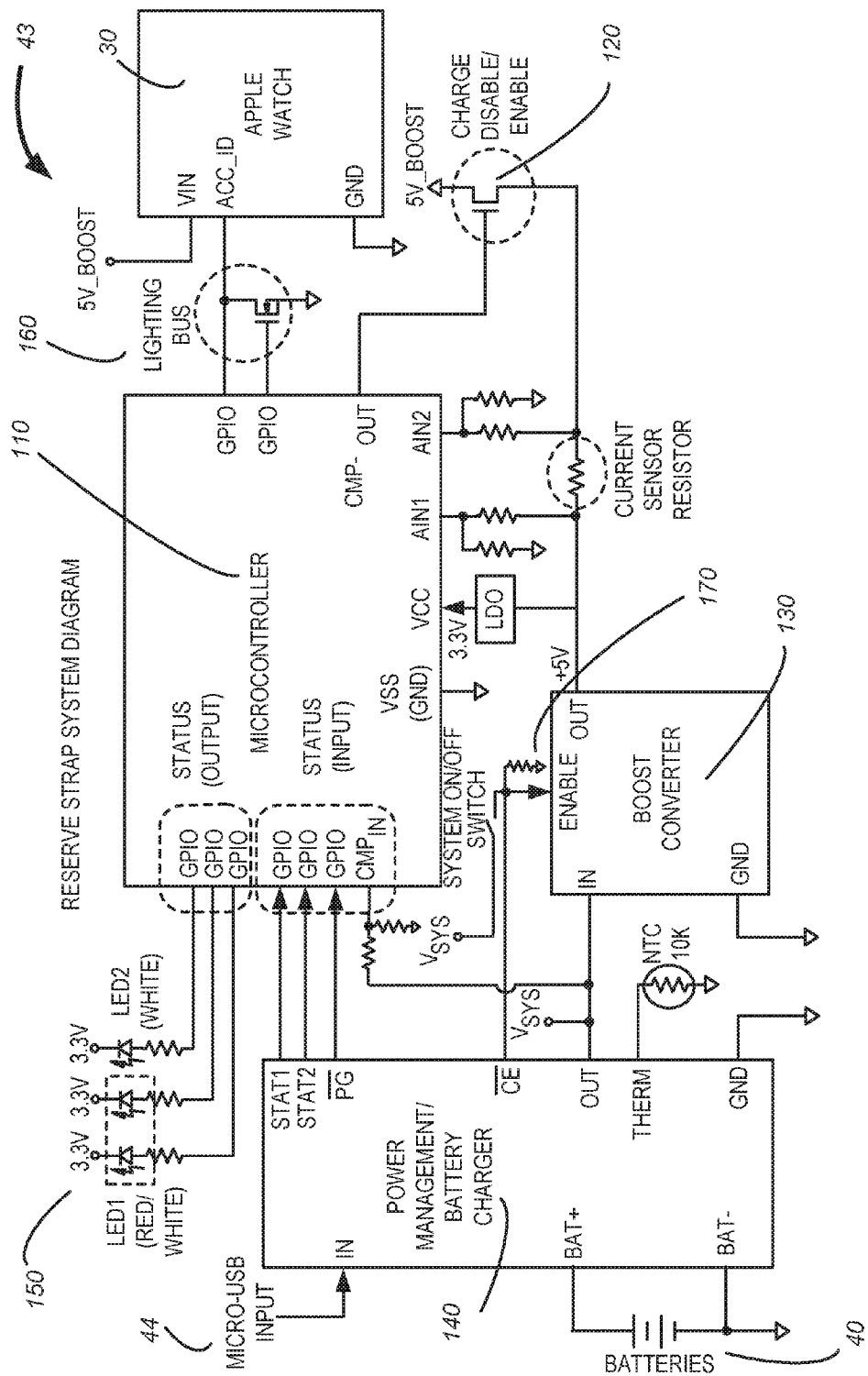
FIG. 18 is a representative schematic of the conductive charging circuit of the smart strap.

Further still, as shown in FIGS. 6, 7 and 18, the smart strap comprises a printed circuit board 40 (PCB) that further comprises a microcontroller 110 configured to sense the voltage level of the rechargeable battery and the presence or absence of power from an external USB port; a switch circuit 120 configured to apply or remove approximately 5V power to or from the portable digital device 30; a boost circuit 130 configured to convert approximately 3.1 V-4.2 V a low power level from the rechargeable battery (ies), such as a Lithium-Ion battery, as a non-limiting example, to (5V) a greater system power, even up to 1 Amp; a power management circuit 140 configured to detect the absence or presence of external (5V) power from the USB port 44 and, based on this detection and the voltage level of the battery, supplies power to the boost circuit 130 either from the external (5V) USB port 44 or the rechargeable batteries 40; a printed circuit board connector 42 configured to provide an electrical interface between the smart strap 10 and an accessory port 33 on the portable digital device 30; a LED 150 configured to indicate the current operating state of the smart strap; and a lightning BUS 160 configured to exchange a digital handshake between the portable digital device and the smart strap to enable a charging circuit on the portable digital device. In some embodiments, the microcontroller 110 further comprises: an on-board memory (not shown); and a computer implemented system for automated control of the battery circuit 41 comprising; a) a digital processing device comprising an operating system configured to perform executable instructions; b) a computer program including instructions executable by the digital processing device to create an application comprising; i.) a software module configured to manage the switch circuit 170 of the smart strap; ii.) a software module configured to manage the boost circuit 130 of the smart strap; iii.) a software module configured to manage the memory (not shown) of the smart strap on the microcontroller 110; and iv.) a software module configured to manage the power management circuit 140 of the smart strap. Still further, the PCB comprises an on/off switch or button 170 operatively connected to the printed circuit board 40 configured to toggle the battery circuit 41 between an activated state (on) and a deactivated state (off).

In some embodiments of the smart strap 10 the conductive charging interface 42 comprises either or both of a male pin (42b), and a female socket (33), as illustrated in FIGS. 3 and 5A. In some embodiments, the conductive charging interface 42, (33) comprises a magnetic connection.

In some embodiments, the smart strap 10 comprises at least a second rechargeable battery 40 operably coupled to the conductive interface 42 through the battery circuit 41, as illustrated in FIGS. 6 and 7.

In some embodiments, the rechargeable battery 40 and the at least second rechargeable battery are separated within the smart strap 10 such that when encased within the first part 11, the first part comprises a flex valley 72 on an external surface of the first part that dips partially between each of the two or more batteries in order for the smart strap to flex around a user's wrist, as illustrated in FIGS. 9A through 10B. In some embodiments, the flexibility of the smart strap is accommodated by and operatively configured on a flex circuit, making the battery circuit more flexible.

In still other embodiments, a second rechargeable battery is encased in either the first part 11 or the second part 12 of the smart strap 10.

In some embodiments, the smart strap rechargeable battery (or batteries) is configured to provide approximately one full battery charge to an internal battery of the portable digital device. In some embodiments, the rechargeable battery is configured to provide multiple charges to an internal battery of the portable digital device. In some embodiments, the rechargeable battery is one of a plurality of rechargeable batteries encased in the first part. In some embodiments, the rechargeable battery is one of a plurality of rechargeable batteries, wherein at least one of the rechargeable batteries is encased in the first part, and wherein at least one of the rechargeable batteries is encased in the second part. In some embodiments, the rechargeable battery is one of a plurality of rechargeable batteries connected in a series circuitry configuration. In some embodiments, the rechargeable battery is one of a plurality of rechargeable batteries connected in a parallel or parallel-series circuitry configuration.

Referring now to FIGS. 1-A, 4-A, 4-B, 8, 9-A, 9-B, 10-C and 11, the smart strap has a clasping mechanism assembly 75, which in this embodiment comprises a strap connector assembly comprising a plurality of strap connection interfaces. These connection interfaces comprise an attachment clasp assembly 75 with a housing or cap 76 and protruding male clasps 25 at the end of the second end 16 of the first part 11, configured to mate with corresponding female receiving members or connection interfaces 19 and wherein the first strap connector interface 75 is configured to detachably connect with one or more of the plurality of second strap connection interfaces 19 positioned along the length of the fourth end 20 of the second part 12.

Referring now to FIGS. 6 and 7-A; in some embodiments, the smart strap 10 comprises a battery cavity 21 that receives the rechargeable battery 40 and entire battery circuit 41 through a battery cavity door 21 or similar closure means that optionally cooperates with or is the first strap connector interface 15 to enclose the rechargeable battery and battery circuit within the first strap 11. As illustrated herein, some embodiments provide an option to make the battery and battery circuit removable and replaceable from within the first strap 11.

In some embodiments, the first part 11 or second part 12 encasing the rechargeable battery 40 comprises an insulation layer or insulating material that shields a user from heat dissipated by the rechargeable battery.

In some embodiments, the first strap attachment interface 13 comprises an insulated lug 42c through which connector pins 42b are inserted which are configured to connect to the portable digital device 30.

Referring now to FIGS. 1-A, 4-B and 7-A, in some embodiments, the smart strap 10 comprises at least one auxiliary interface port 44 with a protective cover 44b configured to receive a power cord connected to an external power source and/or comprises one or more of: a USB connection; a micro-USB connection; a mini-USB connection; a USB-C connection; a Lightning® connection; and a Firewire® connection for receiving a data/power cord.

It should now be apparent through this disclosure that the smart strap 10 described herein is capable of supporting a variety of portable digital devices 30 comprising one or more of a smart watch, a radio, a phone, a computer, an audio device, and a video device.

Provided herein is a detachable smart strap 10 for providing reserve power to a portable digital device 30 comprising: a first part 11 and a second part 12, wherein the first part comprises a first end 14 and a second end 16, and wherein the second part 12 comprises a third end 18 and a fourth end 20; a first strap attachment interface 13 on the first end 14 configured to connect with a first device attachment interface 31 of a portable digital device (as shown in FIGS. 2 and 3); a second strap attachment interface 17 on the third end 18 configured to connect with a second device attachment interface 32 of the portable digital device (as shown in FIG. 4); a conductive charging interface 42 operably linked to either the first strap attachment interface 13 or the second strap attachment interface 17 configured to interface with a socket 33 of the portable digital device 30; an auxiliary capture clasp mechanism 80 configured to augment and further secure the strap attachment interface 13, 17 comprising the conductive charging interface 42 and to prevent unintentional separation of the smart strap 10 from the portable digital device attachment interfaces 31, 32; a strap connector 75 comprising a first strap connection interface 25 at the second end 16 configured to detachably connect with a second strap connection interface 19 at the fourth end 20; a plurality of separated batteries 40 encased within one or both of the first part 11 or the second part 12 of the smart strap 10; a plurality of flex valleys 72 on an external surface of the first part and second part that dips partially between the plurality of separated batteries in order for the smart strap to flex around a user's wrist; a battery circuit 41 within the smart strap comprising at least: the conductive charging interface 42 operably linked to the plurality of separated batteries, and an interface port or charging port 44 connected to the conductive charging interface 42 through the battery circuit 41; an on/off switch or button 45 operatively connected to the battery circuit 41 configured to toggle the battery circuit 41 between an activated state (on) and a deactivated state (off); a digital processing device (Printed Circuit Board or PCB) 43 comprising an operating system configured to perform executable instructions and a memory device operably linked to the battery circuit; a computer program including instructions executable by the digital processing device to create an application comprising a software module configured to manage a plurality of charging circuit conditions; a plurality of sensors configured to monitor battery charge parameters comprising; a portable digital device rechargeable battery charge level; a smart strap battery charge level; a rate of battery charge for either the smart strap and/or the portable digital device; and a rate of battery discharge for either the smart strap and/or the portable digital device; wherein the software module monitors the condition of the batteries of the smart strap and the condition of the rechargeable batteries of the portable digital device, and wherein the software module commands a change in the charging parameters of the portable digital device based at least in part on the power level in an internal battery of the portable digital device, the power level in the battery of the smart strap and input from a user. In some embodiments, the smart strap batteries 40 comprise rechargeable batteries, non-rechargeable batteries; and/or disposable batteries; and are removable and replaceable from within the first strap or the second strap.

Provided herein is another embodiment of a smart strap 10 for a portable digital device 30 comprising a first part 11 and a second part 12, wherein the first part comprises a first end 14 and a second end 16, and wherein the second part 12 comprises a third end 18 and a fourth end 20; a first strap attachment interface 13 on the first end 14 configured to connect with a first device attachment interface 31 of a portable digital device (as shown in FIGS. 2 and 3); a second strap attachment interface 17 on the third end 18 configured to connect with a second device attachment interface 32 of the portable digital device (as shown in FIG. 4); a strap connector assembly 75 comprising a first strap connection interface 25 at the second end 16 configured to detachably connect with a second strap connection 19 interface at the fourth end 20; and a disposable battery 40; wherein the disposable battery is rechargeable; wherein the first strap attachment interface 13 or the second strap attachment interface 17 comprises a conductive charging interface 42 operably linked to the disposable battery 40 through a battery circuit 41 whereby when an interface port or charging port 33 of the portable digital device 30 is connected to the conductive charging interface 42 through the battery circuit 41, and the disposable battery 40 charges an internal battery of the portable digital device. In some embodiments, the battery circuit further comprises a printed circuit board (PCB) 43. In some embodiments, the PCB 43 further comprises a microcontroller 110 configured to sense the voltage level of the disposable battery 40 and the presence or absence of power from an external USB port 44; a switch circuit 120 configured to apply approximately 5V power to the portable digital device; a boost circuit 130 configured to convert approximately 3.1 V-4.2 V of a low power level from the disposable batteries to approximately 5V of a greater system power, up to 1 Amp; a power management circuit 140 configured to detect the absence or presence of external (approximately) 5V power from the external USB port 44 and, based on this detection and the voltage level of the disposable battery, supplies power to the boost circuit either from the external (5V) USB port or the disposable battery 40; a printed circuit board connector 42 configured to provide an electrical interface between the smart strap 10 and a multi-pin, (such as 6-pin) accessory port 33 on the portable digital device 30; a LED 150 configured to indicate the current operating state of the smart strap; and a lightning BUS 160 configured to exchange a digital handshake between the portable digital device 30 and the smart strap 10 to enable a charging circuit 41 on the portable digital device.

In some embodiments, the microcontroller 110 further comprises: an on-board memory; and a computer implemented system for automated control of the battery circuit comprising; a) a digital processing device comprising an operating system configured to perform executable instructions; b) a computer program including instructions executable by the digital processing device to create an application comprising; i.) a software module configured to manage the switch circuit of the smart strap; ii.) a software module configured to manage the boost circuit of the smart strap; iii.) a software module configured to manage the memory of the smart strap on the microcontroller; and iv.) a software module configured to manage the power management circuit of the smart strap.

In some embodiments, the smart strap further comprises an on/off switch or button 45 with a cover 45*b*, operatively connected to the PCB 43 configured to toggle the battery circuit 41 between an activated state (on) and a deactivated state (off).

In some embodiments, the conductive charging interface 42 comprises either or both of a male pin, 42 and a female socket 33. In some embodiments, the smart strap comprises at least a second disposable battery 40 operably coupled to the conductive interface through the battery circuit. In some embodiments, the first disposable battery and the at least second disposable battery are separated within the smart strap such that when encased within the first part 11, the first part comprises a flex valley 72 on an external surface of the first part that dips partially between the two batteries in order for the smart strap to flex around a user's wrist.

Provided herein is still another embodiment of the smart strap 10 comprising a first part 11 and a second part 12, wherein the first part comprises a first end 14 and a second end 16, and wherein the second part 12 comprises a third end 18 and a fourth end 20; a first strap attachment interface 13 on the first end 14 configured to connect with a first device attachment interface 31 of a portable digital device (as shown in FIGS. 2 and 3); a second strap attachment interface 17 on the third end 18 configured to connect with a second device attachment interface 32 of the portable digital device (as shown in FIG. 4); a strap connector assembly 75 comprising a first strap connection interface 25 at the second end 16 configured to detachably connect with a second strap connection 19 interface at the fourth end 20; and a disposable and non-rechargeable battery 40; wherein the first strap attachment interface 13 or the second strap attachment interface 17 comprises a conductive charging interface 42 operably linked to the disposable and non-rechargeable battery 40 through a battery circuit 41 whereby when an interface port or charging port 33 of the portable digital device 30 is connected to the conductive charging interface, whereby the disposable and non-rechargeable battery charges an internal rechargeable battery of the portable digital device.

In some embodiments, the battery circuit 41 further comprises a printed circuit board (PCB) 43. In some embodiments, the printed circuit board 43 further comprises a microcontroller 110 configured to sense the voltage level of the disposable and non-rechargeable battery 40 and the presence or absence of power from an external USB port 44; a switch circuit 120 configured to apply approximately 5V of power to the portable digital device; a boost circuit 130 configured to convert approximately 3.1 V-4.2 V of a low power level from the disposable and non-rechargeable batteries 40 to approximately 5V of a greater system power, up to 1 Amp; a power management circuit 140 configured to detect the absence or presence of external (approximate) 5V power from the external USB port 44 and, based on this detection and the voltage level of the disposable and non-rechargeable batteries 40, supplies power to the boost circuit 130 either from the external (approximate) 5V USB port 44 or the disposable and non-rechargeable batteries 40; a printed circuit board connector 42 configured to provide an electrical interface between the smart strap and a multi-pin, (such as 6-pin) accessory port 33 on the portable digital device 30; a LED 150 configured to indicate the current operating state of the smart strap; and a lightning BUS 160 configured to exchange a digital handshake between the portable digital device 30 and the smart strap 10 to enable a charging circuit 41 on the portable digital device. In some embodiments, the microcontroller 110 further comprises: an on-board memory; and a computer implemented system for automated control of the battery circuit comprising; a) a digital processing device comprising an operating system configured to perform executable instructions; b) a computer program including instructions executable by the digital processing device to create an application comprising; i.) a software module configured to manage the switch circuit of the smart strap; ii.) a software module configured to manage the boost circuit of the smart strap; iii.) a software module configured to manage the memory of the smart strap on the microcontroller; and iv.) a software module configured to manage the power management circuit of the smart strap.

In some embodiments, the smart strap further comprises an on/off switch or button 45 operatively connected to the printed circuit board 43 configured to toggle the battery circuit 41 between an activated state (on) and a deactivated state (off). In some embodiments, the conductive charging interface 42 comprises either or both of a male pin 42b, and a female socket 33.

In some embodiments, the smart strap comprises a second disposable and non-rechargeable battery 40 operably coupled to the conductive interface 42 through the battery circuit 41. In some embodiments, the first disposable and non-rechargeable battery and the second disposable and non-rechargeable battery are separated within the smart strap 10 such that when encased within the first part 11, the first part comprises a flex valley 72, pseudo-joint or flex-joint on an external surface of the first part that dips partially between the two batteries in order for the smart strap 10 to flex around a user's wrist. In some embodiments, the strap connector comprises a plurality of second strap connection interfaces 19, and wherein the first strap connector interface 75 with its plurality of strap attachment clasps 25 is configured to detachably connect with one or more of the plurality of second strap connection interfaces 19 positioned along the length of the fourth end 20 of the second part 12.

In some embodiments, the first strap 11 comprises a battery cavity 21 that receives the disposable and non-rechargeable battery and entire battery circuit 41 through a battery cavity door 21 or similar closure means that optionally cooperates with or is the first strap connector interface 15 to enclose the disposable and non-rechargeable battery 40 and battery circuit 41 within the first strap 11. In some embodiments, the disposable and non-rechargeable battery is removable and replaceable from within the first strap. In some embodiments, the conductive charging interface 41 comprises a magnetic connection. In some embodiments, the battery circuit is a flex circuit 43b.

In some embodiments, the portable digital device 30 as described herein comprises one or more of a smart watch, a radio, a phone, a computer, an audio device, and a video device.

In some embodiments, the smart strap further comprises an auxiliary interface port 44 configured to provide data transfer capability, wherein the auxiliary interface port is configured to receive a cord connected to an external auxiliary device and comprises one or more of: a USB connection; a micro-USB connection; a mini-USB connection; a USB-C connection; a Lightning® connection; and a Firewire® connection.

In some embodiments, one of the first strap attachment interface 13 or the second strap attachment interface 17 secure to one of the first device attachment interface 31 or the second device attachment interface 32 with a sliding interface, a press-fit interface or a snap-fit interface. In some embodiments, the sliding interface, the press-fit or snap-fit interface further comprises at least one secondary capture mechanism 80 to further secure the sliding, press-fit or snap-fit interfaces to prevent unintentional separation of the smart strap 10 from the portable digital device attachment interfaces 31, 32.

In some embodiments, the disposable and non-rechargeable battery 40 is one of a plurality of disposable and non-rechargeable batteries encased in the first part 11 of the smart strap 10. In some embodiments, when the disposable and non-rechargeable battery is in the first part of the strap 11, the first strap attachment interface 13 comprises an insulated lug 42c, through which connector pins 42b are inserted which are configured to connect the portable digital device 30. In some embodiments, the disposable and non-rechargeable battery is encased within the first part 11 or the second part 12 of the smart strap. In some embodiments, the disposable and non-rechargeable battery is one of a plurality of disposable and non-rechargeable batteries encased in the first part 12 and/or the second part 12 of the smart strap. In some embodiments, the disposable and non-rechargeable battery is one of a plurality of disposable and non-rechargeable batteries, wherein at least one of the disposable and non-rechargeable batteries is encased in the first part, and wherein at least one of the disposable and non-rechargeable batteries is encased in the second part. In some embodiments, the first part 11 and/or second part 12 encasing the disposable and non-rechargeable battery comprises an insulation layer or insulating material that shields a user from the dissipated heat of the disposable and non-rechargeable battery.

In any one of the embodiments described herein, the disposable and non-rechargeable battery 40 is configured to provide approximately one full battery charge to an internal battery of the portable digital device. In any one of the embodiments described herein, the disposable and non-rechargeable battery is configured to provide multiple charges to an internal battery of the portable digital device.

In some embodiments, the disposable and non-rechargeable battery is one of a plurality of disposable and non-rechargeable batteries connected in a series circuitry configuration. In some embodiments, the disposable and non-rechargeable battery is one of a plurality of disposable and non-rechargeable batteries connected in a parallel or parallel-series circuitry configuration. In some embodiments, the disposable and non-rechargeable battery and battery circuit are operatively configured on a flex circuit 43b.

Referring again to FIGS. 1 and 1-A, in some embodiments, the smart strap 10 comprises two major components, a first part 11 and a second part 12. The first part 11 comprising a first end 14 and a second end 16; and the second part 12 comprising a third end 18 and a fourth end 20; a first strap attachment interface 13 on the first end 14 of the first part of said strap 11 configured to connect with a first device attachment interface 31 of a portable digital device 30, (as shown in FIG. 2); a first strap connector interface 15 (as illustrated in the detail view of FIG. 7) further comprising at least one attachment clasp 25 positioned about the second end 16 of the first part of said strap 11 configured to connect with a plurality of second strap connection interfaces 19 positioned along the length of the second part of said strap 12, (as illustrated in FIG. 8); a second strap attachment interface 17 on the third end 18 of the second part 12 of said strap 10 configured to connect with a second device attachment interface 32 of the portable digital device 30 (as illustrated in FIG. 4). On at least one end 14, 18, of the strap 11, (or 12), located within the strap attachment interface 13, 17, is a conductive charging interface 42, comprising a plurality of conductive charging pins configured as a multi-pin connector 42b (as illustrated in FIGS. 5 and 5-A). The pins are configured to mate with a multi-pin accessory port 33 of a portable digital device 30 (as illustrated in FIGS. 2, 3 and 4).

In some embodiments of the smart strap, the battery circuit further comprises a printed circuit board (PCB) 43.

In some embodiments of the smart strap, the conductive charging interface 42 comprises a male multi-pin connection interface 42b.

In some embodiments of the smart strap, the battery circuit 41 is flexible.

In some embodiments of the smart strap, the at least one rechargeable battery 40 is a Lithium polymer cell.

In some embodiments, the smart strap 10 comprising the at least one rechargeable battery 40 is flexible.

In some embodiments of the smart strap, the at least one rechargeable battery is flexible 40.

In some embodiments of the smart strap, the at least one rechargeable battery 40 comprises a non-flat (curved) shaped.

In some embodiments of the smart strap, the at least one rechargeable battery 40 comprises a prismatic structure.

In some embodiments of the smart strap, the at least one rechargeable battery 40 and battery circuit 41 are operatively configured on a flex circuit.

In some embodiments of the smart strap, the battery circuit 41 is a flex circuit.

Turning now to FIGS. 6 & 7, one half of the smart strap 10 is illustrated in exploded views, illustrating the outer casing of the of the smart strap 11 and further comprising a battery circuit comprising at least one battery 40 or a group of batteries 40 connected in series to a PCB. The PCB is optionally constructed as a component of a flexible circuit further comprising the conductive charging interface 42 comprising a male multi-pin connection interface 42b. One of skill in the art will recognize that the multi-pin connection interface could also be constructed as a female connection with a mating male connection on the portable digital device 30.

In some embodiments, the smart strap 10 is configured to supply battery power to the portable digital device.

In some embodiments, the smart strap further comprises an on/off button 45 operatively connected to the printed circuit board 43. As further illustrated in FIGS. 6 and 7 the strap is optionally configured with an on/off button 45 and button cover 45b in the battery circuit, providing the user with an option to selectively engage or disengage the reserve battery of the smart strap in order to supply power to the portable digital device 30.

In some embodiments of the smart strap, the auxiliary interface port 44 of the smart strap is configured to receive a power cord connected to an external power source.

In some embodiments of the smart strap, the auxiliary interface port 44 comprises: a USB connection; a micro-USB connection; a mini-USB connection; a USB-C connection: a Lightning® connection; and a FireWire® connection; wherein the connection of the auxiliary interface port is configured to provide a charging access port for the at least one rechargeable battery 40 of the smart strap.

In some embodiments, the smart strap comprises an auxiliary interface port 44 configured to interface with the battery circuit 41. The auxiliary interface port 44, as illustrated in FIGS. 4-A and 7 provides the user with the ability to recharge the reserve batteries of the smart strap, while the and port cover 44b protects the port from dirt and moisture damage.

In some embodiments of the smart strap, as illustrated in the schematic circuit diagram in FIG. 18, the printed circuit board comprises at least two or more of: a microcontroller with on-board memory, a switch circuit, a boost circuit, a power management circuit, a multi-pin printed circuit board connector, a LED, a lighting BUS and a Lightning BUS. As further illustrated in FIG. 4-A, the smart strap is optionally provided with a LED charge status indicator 46.

As used herein, Lightning® is a proprietary computer bus and power connector created by Apple® Inc. to replace its previous proprietary 30-pin dock connector, and is used to connect Apple mobile devices like iPhones®, iPods® and iPods® to host computers, external monitors, cameras, USB battery chargers and other peripherals. Using eight pins instead of thirty, the Lightning connection is significantly more compact than the 30-pin dock connector and can be inserted with either side facing up. The Lightning connection is an eight-pin connector which carries a digital signal. Unlike the connector it replaces (or the standard USB plug), the Lightning connection is more convenient to use because it can be inserted either face up or face down.

In some embodiments of the smart strap, the first strap attachment interface and the second strap attachment interface secure to the first device attachment interface and the second device attachment interface with a press-fit or snap-fit interface.

In some embodiments, the press-fit or snap-fit interface further comprises at least one secondary capture mechanism to further secure the press-fit or snap-fit interfaces to prevent unintentional separation of the smart strap from the portable digital device attachment interfaces.

In some embodiments of the smart strap, the first strap attachment interface 13 and the second strap attachment interface 17 secure to the first device attachment interface 31 and the second device attachment interface 32 by means of a sliding interface.

In some embodiments of the smart strap, the first strap attachment interface 13 of the first part of the smart strap 11 and the second strap attachment interface 17 of the second part of the smart strap 12, are interchangeable with either the first device attachment interface 31 of the portable digital device 30 or the second device attachment interface 32 of the portable digital device.

In some embodiments of the smart strap, the male pins 42b of the multi-pin connection interface 42 are retractable within the strap attachment interface 13, 17.

In some embodiments of the smart strap, the first strap connector interface 15 on the second end of the strap 16 is further configured to provide a closure for an internal battery compartment 21 comprising an opening on the second end of the strap 16.

In some embodiments of the smart strap, the first strap connector interface 15 on the second end of the strap 16 comprising at least one clasping mechanism 25 is configured to be captured within attachment clasp receivers 22, providing a means to seal the battery circuit/housing cavity 21 within the smart strap. The strap connector interface 15 is further configured to provide a clasping mechanism 25 for attachment to one or more of the plurality of the second strap connection interfaces 19 positioned along the length of the second part of said strap 12. Additionally, the strap connector interface 15 optionally comprises a receiver slot (not shown) adapted to receive a logo badge/closure door securement 49 that secures a closure door 24 over the over the connector interface 15 and simultaneously seals the battery circuit/housing cavity 21 on the second end of the strap 16.

In some embodiments of the smart strap, the at least one rechargeable battery 40 encased within said smart strap 10 is configured to provide approximately one full charge to an internal battery of the portable digital device 30 to which it is configured to connect.

In some embodiments of the smart strap, the at least one rechargeable battery 40 encased within said smart strap 10 is configured to provide at least one full charge to an internal battery of the portable digital device 30 to which it is configured to connect.

In some embodiments of the smart strap, the at least one rechargeable battery 40 encased within said smart strap 10 is configured to provide at least a partial charge to an internal battery of the portable digital device 30 to which it is configured to connect.

In some embodiments of the smart strap, the at least one rechargeable battery 40 encased within said smart strap 10 is configured to provide multiple charges to an internal battery of the portable digital device 30 to which it is configured to connect. The multiple charges are deliverable in either full or partial charges.

In some embodiments of the smart strap 10, the at least one rechargeable battery 40 encased within said smart strap is configured to reside within the first part 11 or the second part 12 of the smart strap.

In some embodiments of the smart strap 10 comprising a plurality of batteries 40, one or more rechargeable batteries 40 are configured to reside within the first part 11, and one or more rechargeable batteries 40 are configured to reside within the second part 12.

In some embodiments of the smart strap, the at least one rechargeable battery 40 encased within said smart strap 10 comprises a plurality of batteries 40, wherein more than one rechargeable battery 40 is configured to reside within the first part 11, and wherein one or more rechargeable batteries 40 are configured to reside within the second part 12.

In some embodiments of the smart strap, the smart strap is configured with a plurality of batteries connected in a series circuitry configuration, such as illustrated in FIGS. 6 and 7.

In some embodiments of the smart strap, the smart strap is configured with a plurality of batteries connected in a parallel or parallel-series circuitry configuration.

In some embodiments of the smart strap, the rechargeable batteries, the battery circuit and conductive charging interface are configured to be removable from the smart strap.

In some embodiments of the smart strap, the conductive charging interface 42 comprises a plurality of spring-loaded 47 conductive connector pins 42b integrated with a flex circuit, and wherein said connector pins 42b are inserted through an insulated lug 50 in a strap attachment interface 13, 17. In some embodiments of the smart strap, the conductive charging interface comprises a plurality of conductive connector pins integrated with a flex circuit, and wherein said connector pins are part of an insulated lug in a strap attachment interface.

In some embodiments of the smart strap, the conductive charging interface 42 comprises a female connection interface.

In some embodiments of the smart strap, the conductive charging interface 42 is configured to provide additional power to an existing power source of the portable digital device.

In some embodiments of the smart strap, the conductive charging interface 42 is configured to interface with port 33 of the portable digital device 30.

In some embodiments of the smart strap, the conductive charging interface 42 is configured to interface with a diagnostic interface port 33 of the portable digital device 30.

In some embodiments of the smart strap, the on/off button 45 activates and deactivates the battery circuit 41.

In some embodiments of the smart strap, the battery circuit is configured to determine a charge state of a power source in the portable digital device 30 and provide power from the at least one smart strap battery to prolong the available charge state of the power source in the portable digital device.

In some embodiments of the smart strap, the battery circuit 41 is configured to simultaneously share power received from an auxiliary interface port 44 between the at least one rechargeable battery of smart strap 40 and the internal power source of the portable digital device 30.

In some embodiments of the smart strap, a microcontroller with on-board memory further comprises a computer implemented system for automated control of the battery circuit comprising: a digital processing device comprising an operating system configured to perform executable instructions and a memory; a computer program including instructions executable by the digital processing device to create an application comprising: a software module configured to manage the switch circuit of the smart strap; a software module configured to manage the boost circuit of the smart strap; a software module configured to manage the memory of the smart strap found on the microcontroller; and a software module configured to manage the power management circuit of the smart strap.

In some embodiments of the smart strap, the first strap connector interface 15 comprising at least one attachment clasp 25 on the second end of the strap 16 is configured to provide a conductive attachment interface for attachment to one or more of a plurality of conductive attachment interfaces 19 positioned along the second part of the strap 12 and wherein the plurality of conductive attachment interfaces 19 are connected to at least one battery 40 in the second part of the strap 12, wherein power from the at least one rechargeable battery 40 encased within the first part of the strap 11 is optionally shared in series with at least one rechargeable battery 40 encased within the second part of the strap 12.

In some embodiments of the smart strap, both the first strap attachment interface 13 and the second strap attachment interface 17 of the smart strap comprise a conductive charging interface 42 configured to interface with an interface port 33 located within one or more of the device attachment interfaces 31, 32 of the portable digital device 30.

In some embodiments of the smart strap, the at least one rechargeable battery and the battery circuit encased within said smart strap are configured to harvest energy for recharging said at least one rechargeable battery from at least one of multiple sources comprising: a chemical power source; a solar power source; a kinetic power source; a magnetic power source; a piezoelectric power source; an external electric power source and a thermal power source.

In some embodiments, the smart strap is configured to be worn as an article of apparel such as watch band. Alternatively, the smart strap is optionally worn on an arm and used to power a smart device such as a MP3 or MP4 player, or similar smart device.

In some embodiments of the smart strap, the portable digital device is a smart watch.

In some embodiments of the smart strap, the portable digital device is a radio. In some embodiments of the smart strap, the portable digital device is a digital phone. In some embodiments of the smart strap, the portable digital device is a computer. In some embodiments of the smart strap, the portable digital device is an audio device. In some embodiments of the smart strap, the portable digital device is a video device.

In some embodiments of the smart strap, the portable digital device is any combination of devices comprising: a smart watch; a radio; a phone; a computer; an audio device; and a video device.

Turning now to FIGS. 9-A through 12-C, yet another configuration of the Smart Strap 70 is illustrated in numerous views, illustrating an alternative strap attachment clasp assembly 75 and a unique capture clasp assembly 80 that works in concert with the strap attachment interface 13 as an alternate means to secure the conductive charging interface 42, 42b between the Smart Strap 70 and the portable digital device 30.

As shown in FIG. 9-A the alternative strap attachment clasp assembly 75 is assembled to the end of the first part of the band 11 with a cap feature 76 comprising compressive attachment features such as screws (83), bolts and nuts, pins, rivets or similar articles used for assembly of the strap attachment clasps 25 through the strap. The clasp assembly 75 optionally further comprises a receiver slot (not shown) adapted to receive a logo badge/closure door securement 49 that secures a closure door (not shown in this view) on the end of the clasp assembly 75 and simultaneously seals the end of the strap 11 comprising the battery circuit/housing cavity (21) within.

In FIG. 9-B, a bottom view of the Smart Strap 70 is shown with a capture clasp assembly 80. This configuration of capture clasp 80 provides the user with the ability to insert or press-fit and capture the strap attachment interface 13 directly into the receiving slot (i.e.: 31) of a portable digital device 30 without sliding it in from the side of the receiving slot. This provides the advantage of having a conductive charging interface 42 that does not require retractable pins 42b or corresponding springs. The capture clasp assembly 80 comprises a capture clasp or spring clasp 81 held in place by a capture plate 82 and compressive attachment features such as screws (83), bolts and nuts, pins, rivets or similar articles, and configured to secure the inserted strap attachment interface 13 to a portable digital device 30 by engaging the lip of the receiving slot (i.e.: 31) to prevent it from pulling out. One of skill in the art will appreciate that other means of attachment are also possible.

FIGS. 10-A and 10-B provide side and cut-away side views of the alternative configuration of the Smart Strap 70 illustrating one possible assembly configuration and component placement within the configuration. FIG. 10-B also shows one possible placement of the batteries 40, the conductive charging interface 42, the multi-pin connectors 42b the attachment clasp assembly 80 and the alternate strap attachment clasp assembly 75. FIG. 10-C illustrates an isometric end view of the smart strap configuration shown in FIG. 9-A, showing the logo badge and closure door securement 49 for the internal battery compartment of the smart strap.

FIG. 11 provides an inferior exploded view of the alternate strap attachment clasp assembly 75 of the first strap 11 illustrating the strap attachment clasps 25 and their relative placement to the plurality of second strap 12 attachment interfaces 19 prior to assembly.

Turning now to FIGS. 12-A-12-D, one sees detailed views of one configuration of the first strap attachment interface 13 comprising the conductive pin connection 42 and the capture clasp assembly 80, comprising a capture clasp 81 and assembly capture plate 82. The capture clasp assembly is assembled to the first strap attachment interface 13 with compressive attachment features such as screws (83), bolts and nuts, pins, rivets or similar articles used for assembly through the strap. One of skill in the art will appreciate that other means of attachment are also possible. The capture clasp assembly 80 optionally comprises one of a variety of capture mechanisms such as spring clips, interference pins, screws or other quick-assembly/disassembly apparatus for quick and secure attachment of the strap attachment interface 13 to a portable digital device attachment interface (31). Additionally, an assembly/disassembly tool 90 comprising a customized probe tip 91 such as that shown in FIG. 12-D is optionally provided to assist a user with the insertion or release of the capture clasp 81 to the portable digital device attachment interface (31). One of skill in the art would recognize that the press-fit or snap-fit configuration of the strap attachment interface with the clasp assembly 80 would be applicable to either the first or second the strap attachment interface.

Referring now to FIGS. 13-A through 15-B, one of skill in the art quickly appreciates the ease of assembly that the press-fit or snap-fit configuration of the strap attachment interface with the clasp assembly 80 provides when fixing the strap 70 to a portable digital device 30.

Provided herein is a smart strap for providing reserve power to a portable digital device comprising at least a first end and a second end, wherein at least one of the first end or second end comprises an attachment interface for connecting the smart strap to said portable device; a plurality of rechargeable batteries encased within the smart strap; a battery circuit encased within said smart strap operatively connected to said rechargeable batteries; a digital processing device comprising an operating system configured to perform executable instructions and a memory device; a computer program including instructions executable by the digital processing device to create an application comprising a software module configured to manage a plurality of charging circuit conditions; a plurality of sensors configured to monitor battery charge parameters comprising: a portable digital device rechargeable battery charge level, a smart strap rechargeable battery charge level, a rate of battery charge, and a rate of battery discharge; wherein the software module monitors the condition of the rechargeable batteries of the smart strap and the condition of the rechargeable batteries of the portable digital device; wherein the software module commands a change in the charging parameters of the portable digital device based at least in part on the power level in the battery of the portable digital device, the power level in the battery of the smart strap and input from a user; and wherein the smart strap is configured to be worn as an article of apparel.

In some embodiments of the smart strap, the software module assists the portable digital device in determining where to draw power.

In some embodiments of the smart strap, the rechargeable batteries and battery circuit are operatively connected to a conductive charging interface located within one of the strap attachment interfaces, wherein the conductive charging interface is configured to interface through an interface port of the portable digital device.

In any one of the embodiments described herein, the smart strap described herein is configured for use as an article of apparel. In some embodiments, the smart strap is configured to be worn as an article of apparel about the wrist of a person. In some embodiments, the smart strap is configured to be worn as an article of apparel about the arm of a person.

In some embodiments, the smart strap is configured to be worn as an article of apparel attached to the clothing of a person, such as attached to a belt, a clothing loop or utility strap.

Still further, in some embodiments, the smart strap as described in any one of the embodiments herein is configured for use as an article of clothing, jewelry, footwear or headwear attachment.

Provided herein is a method of providing a smart strap, as described in any one of the embodiments herein, as an article of apparel.

Provided herein is a smart strap for providing reserve power to a portable digital device comprising: at least a first end and a second end, each end configured with at least one attachment feature for securing the strap ends to one another; two attachment interfaces for connecting the smart strap to said portable device; a plurality of rechargeable batteries encased within the smart strap; a battery circuit encased within said smart strap configured to operatively connect to said rechargeable batteries; a digital processing device comprising an operating system configured to perform executable instructions and a memory device; a computer program including instructions executable by the digital processing device to create an application comprising a software module configured to manage a plurality of charging circuit conditions; a plurality of sensors configured to monitor battery charge parameters comprising: a portable digital device rechargeable battery charge level, a smart strap rechargeable battery charge level, a rate of battery charge, and a rate of battery discharge; wherein the software module monitors the condition of the rechargeable batteries of the smart strap and the condition of the rechargeable batteries of the portable digital device; and wherein the software module commands a change in the charging parameters of the portable digital device based at least in part on the power level in the battery of the portable digital device, the power level in the battery of the smart strap and input from a user.

Turning now to FIGS. 16-A-16-D, multiple alternative embodiments 60 of the smart strap have been illustrated, wherein, in some embodiments, the smart strap further comprises a backing member 26 between and beneath the two attachment interfaces 13, 14 for insertion into attachment interfaces 31, 32 of a portable digital device 30. As one of skill in the art would appreciate, a portable digital device would easily assemble to the embodiments provided in FIGS. 16-A through 16-C with a simple sliding attachment movement. The backing support 26 may provide additional protection or comprise sensors or additional interface means for communication with the portable digital device. The backing member 26 would further support and/or protect the portable digital device between the attachment interfaces.

In some embodiments, such as any of those shown in FIGS. 1 through 10-C, the two part smart strap further comprises a backing member located between and beneath the two attachment interfaces. In some embodiments, the backing member is detachable. the backing member 26 would further support and/or protect the portable digital device between the attachment interfaces.

Further still, FIG. 17 illustrates yet another alternative embodiment of the smart strap 100, wherein the strap is configured with a single strap having a first end and a second end, and further comprising separate battery compartments built into the strap on either/both sides of the area that would capture the watch. The strap may be a 1-piece configuration 100 comprising internal flexible batteries 40 and a magnetic pad or other means for attaching to a portable digital device.

Provided herein is a band system 10 for a wearable device, comprising: a first flexible unitary part 11 and a second flexible unitary part 12; wherein the first flexible unitary part comprises a first section 14 at a first end of unitary part 11 and a second end 16, and wherein the second flexible unitary part comprises a third section 18 at a third end of unitary part 12 and a fourth end 20, a first detachable strap attachment interface 13, having a first attachment interface end 13a and a second attachment interface end 13b, the first attachment interface end 13a affixable to the first end of unitary part 11 and configured to connect with a first device attachment interface of either a portable digital device or a case for holding the portable digital device; a second detachable strap attachment interface 17, having a first attachment interface end 17a and a second attachment interface end 17b, affixed on the third end of unitary part 12 configured to connect with a second device attachment interface of either the portable digital device or the case for holding the portable digital device; a strap connector comprising at least a first strap connection interface 25 near the end of the second end 16 configured to detachably connect with at least one second strap connection interface 19 located along the fourth end 20 of unitary part 12; a rechargeable battery 40 within the first flexible unitary part 11 or the second flexible unitary part 12; and a band system charging interface 35 within either the first detachable strap attachment interface 13 or the second detachable strap attachment interface 17 configured to interface with a charging interface of the first device attachment interface of either a portable digital device or a case for holding the portable digital device; wherein the band system charging interface is operably linked to the rechargeable battery 40 through a detachable connection mechanism 95 and a battery circuit 41.

As illustrated in FIGS. 19-A and 19-B the flexible unitary band system comprises unitary straps adaptable to be worn about a user's wrist or arm and comprise a battery or multiple batteries, held within a battery/circuit housing cavity, (not shown), connected in series and capable of being connected to a portable digital device such as a smart watch, MP3/MP4 player or the like. Alternatively, the band system is attachable to a protective case. In some embodiments, the protective cases of many portable devices also contain supplemental rechargeable batteries, which could also be recharged by the unitary band system.

Due to the large variety of potential interface connections available from a multitude of portable digital device manufactures, the inventors have anticipated the need for interchangeable connective interfaces for the flexible unitary band system. Understanding that the flexible unitary band component comprising the rechargeable battery(ies) is itself unitary in construction, the detachable strap attachment interface feature provides a unique capability not found in other systems.

In some embodiments, the first detachable strap attachment interface 13 and the second detachable strap attachment interface 17, are each provided with an adapter connection interface 95 capable of connecting first detachable strap attachment interface 13 with a mating (male/female) adapter connection interface 95 on the first section 14 at the first end of the first flexible unitary part 11 and the second detachable strap attachment interface 17 with a mating (male/female) adapter connection interface 95 on the third section 18 at the third end of the second flexible unitary part 12; wherein the adapter connection interface 95 of the first detachable strap attachment interface 13 and the second detachable strap attachment interface 17 comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection; and wherein the adapter connection interface 95 on the first section 14 at the first end of the first flexible unitary part 11 and the third section 18 at the third end of the second flexible unitary part 12 comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection.

As illustrated in FIGS. 19-C through 19-I, by providing this feature at either connective end of the band system, the strap system becomes extremely versatile. Further still, the inventor anticipated the potential need to provide versatility in the connection mechanism of the detachable strap attachment interface itself to the unitary battery band, allowing for a variety of attachment means such as magnetic, all types of USB connections, lightning connections, and pin connections to name a few.

Additionally, the strap system comprising the detachable strap attachment interface, also comprises at least one band system charging interface within either the first or second detachable strap attachment interface. In some embodiments, the band system charging interface 35 comprises an adapter connection interface 37 capable of interfacing with an adapter connection of a digital device comprising: a magnetic interface connection; a pin-type interface connection; a USB interface connection; a micro-USB interface connection; a mini-USB interface connection; a USB-C interface connection; a Lightning interface connection; and a Firewire interface connection. One of skill would understand that it is also possible to have more than one band system charging interface, if needed, by placing a charging interface in both the first and second detachable strap attachment interface. Alternatively, one could also place a different type of system charging interface in each of the first and second detachable strap attachment interface; such as a pin-type interface in one strap attachment interface and a mini-USB-type interface in the other strap attachment interface.

In some embodiments, the band system further comprises: at least a second rechargeable battery within the first flexible unitary part or the second flexible unitary part; wherein the battery circuit optionally bridges the first flexible unitary part and the second flexible unitary part across the strap connector. In some embodiments, the band system further comprises: a plurality of separated batteries encased within one or both of the first flexible unitary part or the second flexible unitary part.

The band system provides for a configuration wherein the unitary components comprise more than one battery in the flexible body of the band. In the case where a band comprises a linking connector between unitary battery housings, the linking connector, or strap connection interface also acts as a component of the battery circuit, to complete the circuit between the unitary battery housings.

In some embodiments, the band system further comprises: a plurality of flex valleys on an external surface of the first flexible unitary part and second flexible unitary part that dip partially between the plurality of separated batteries in order for the band system to flex around a user's wrist, as illustrated in FIGS. 19-A and 19-B.

In some embodiments, the band system further comprises: an on/off switch or button operatively connected to the battery circuit configured to toggle the battery circuit between an activated state (on) and a deactivated state (off). Placement of the button can be in any convenient location on the band system.

As illustrated in FIG. 21-A, in some embodiments, the band system further comprises: a band system battery charging interface 44; wherein the band system battery charging interface is configured anywhere along an outer edge or exposed outer surface of the first flexible unitary part 11 or the second flexible unitary part 12. In some embodiments, the band system further comprises: a charging adapter connection 85 having a first end 85a and a second end 85b, each end an interchangeable adapter connection interface 87; and a flexible wired connection 86 between the first charging adapter connection end and second charging adapter connection end.

As further illustrated in FIGS. 21-B through 21-E, a plurality of possible interchangeable adapter connection interfaces comprise: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection, to name but a few.

In some embodiments, the band system further comprises: a digital processing device comprising an operating system configured to perform executable instructions and a memory device operably linked to the battery circuit; a computer program including instructions executable by the digital processing device to create an application comprising a software module configured to manage a plurality of charging circuit conditions; a plurality of sensors configured to monitor battery charge parameters comprising: a portable digital device rechargeable battery charge level; a band system battery charge level; a rate of battery charge; and a rate of battery discharge; wherein the software module monitors the condition of the batteries of the band system and the condition of the rechargeable batteries of the portable digital device, and wherein the software module commands a change in the charging parameters of the portable digital device based at least in part on the power level in the battery of the portable digital device, the power level in the battery of the band system and input from a user. The digital processing device can be integrally placed within the flexible unitary part.

In some embodiments, the first detachable strap attachment interface 13 and the second detachable strap attachment interface 17, are each provided with an auxiliary capture clasp mechanism 80, as illustrated in FIGS. 12-A through 12-D, configured to augment and further secure the strap attachment interface 13, 17 to a portable digital device to prevent unintentional separation of the flexible unitary band system 10 from the portable digital device attachment interfaces.

Provided herein is a band system 10 for a wearable device, comprising: a first flexible unitary part 11, a second flexible unitary part 12 and an elastic part 38; wherein the first flexible unitary part comprises a first section 14 and a second end 16, wherein the second flexible unitary part comprises a third section 18 and a fourth end 20, and wherein the elastic part 38, comprising a material with resilient elongation properties and further comprising a flexible portion of a battery circuit 41, is affixed to and adjoins the first flexible unitary part 11 and the second flexible unitary part 12 at or about the ends of the second end 16 and the fourth end 20, a first detachable strap attachment interface 13, having a first end 13a and a second end 13b, the first end 13a affixable to the first section 14 and configured to connect with a first device attachment interface of either a portable digital device or a case for holding the portable digital device; a second detachable strap attachment interface 17, having a first end 17a and a second end 17b, affixed on the third section 18 configured to connect with a second device attachment interface of either the portable digital device or the case for holding the portable digital device; a rechargeable battery within the first flexible unitary part or the second flexible unitary part, held in a battery/circuit housing cavity, (not shown); and a band system charging interface 35 within either the first detachable strap attachment interface 13 or the second detachable strap attachment interface 17 configured to interface with a charging interface of the first device attachment interface of either a portable digital device or a case for holding the portable digital device; wherein the band system charging interface is operably linked to the rechargeable battery 40 through a detachable connection mechanism 95 and a battery circuit 41.

As illustrated in FIGS. 20-A and 20-B the flexible unitary band system comprises unitary straps 11, 12 adaptable to be worn about a user's wrist or arm and further comprises an elastic part 38 comprising a material with resilient elongation properties to provide even greater sizing adaptability, forming a truly unitary system. Further still some embodiments comprise a single battery or multiple batteries connected in series and capable of being connected to a portable digital device such as a smart watch, MP3/MP4 player or the like. Alternatively, the band system is attachable to a protective case. In some embodiments, the protective cases of many portable devices also contain supplemental rechargeable batteries, which could also be recharged by the unitary band system.

As noted previously, due to the large variety of potential interface connections available from a multitude of portable digital device manufactures, the inventors have anticipated the need for interchangeable connective interfaces for the flexible unitary band system. Understanding that the flexible unitary band component comprising the rechargeable battery(ies) is itself unitary in construction, the detachable strap attachment interface feature provides a unique capability not found in other systems.

In some embodiments, the first detachable strap attachment interface 13 and the second detachable strap attachment interface 17, are each provided with an adapter connection interface 95, as previously illustrated in FIGS. 19-C and 19-D, capable of connecting first detachable strap attachment interface 13 with a mating (male/female) adapter connection interface 95 on the first section 14 of the first flexible unitary part 11 and the second detachable strap attachment interface 17 with a mating (male/female) adapter connection interface 95 on the third section 18 of the second flexible unitary part 12; wherein the adapter connection interface 95 of the first detachable strap attachment interface 13 and the second detachable strap attachment interface 17 comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection; and wherein the adapter connection interface 95 on the first section 14 of the first flexible unitary part 11 and the third section 18 of the second flexible unitary part 12 comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection.

As previously illustrated in FIGS. 19-C through 19-I, by providing this feature at either connective end of the band system, the strap system becomes extremely versatile. Further still, the inventor anticipated the potential need to provide versatility in the connection mechanism of the detachable strap attachment interface itself to the unitary battery band, allowing for a variety of attachment means such as magnetic, all types of USB connections, lightning connections, and pin connections to name a few.

Additionally, as described previously, the strap system comprising the detachable strap attachment interface, also comprises at least one band system charging interface within either the first or second detachable strap attachment interface. In some embodiments, the band system charging interface 35 comprises an adapter connection interface 37 capable of interfacing with an adapter connection of a digital device comprising: a magnetic interface connection; a pin-type interface connection; a USB interface connection; a micro-USB interface connection; a mini-USB interface connection; a USB-C interface connection; a Lightning interface connection; and a Firewire interface connection. One of skill would understand that it is also possible to have more than one band system charging interface, if needed, by placing a charging interface in both the first and second detachable strap attachment interface. Alternatively, one could also place a different type of system charging interface in each of the first and second detachable strap attachment interface; such as a pin-type interface in one strap attachment interface and a mini-USB-type interface in the other strap attachment interface.

In some embodiments, the band system further comprises: at least a second rechargeable battery within the first flexible unitary part or the second flexible unitary part; wherein the battery circuit optionally bridges the first flexible unitary part and the second flexible unitary part across the strap connector. In some embodiments, the band system further comprises: a plurality of separated batteries encased within one or both of the first flexible unitary part or the second flexible unitary part.

The band system provides for a configuration wherein the unitary components comprise more than one battery in the flexible body of the band. In the case where a band comprises an elastic connector 38 between unitary battery housings 11, 12, the elastic connector, also comprise a flexible component of the battery circuit, to complete the circuit between the unitary battery housings.

In some embodiments, the band system further comprises an on/off switch or button operatively connected to the battery circuit configured to toggle the battery circuit between an activated state (on) and a deactivated state (off). Placement of the button can be in any convenient location on the band system.

As further illustrated in FIG. 20-A, in some embodiments, the band system further comprises: a band system battery charging interface 44; wherein the band system battery charging interface is configured anywhere along an outer edge or exposed outer surface of the first flexible unitary part 11 or the second flexible unitary part 12. In some embodiments, the band system further comprises: a charging adapter connection 85, as shown in FIG. 21-A having a first end 85a and a second end 85b, each end having an interchangeable adapter connection interface 87; and a flexible wired connection 86 between the first charging adapter connection end and second charging adapter connection end; wherein the interchangeable adapter connection interfaces comprises: a magnetic interface connection; a pin-type interface connection; a USB interface connection; a micro-USB interface connection; a mini-USB interface connection; a USB-C interface connection; a Lightning interface connection; a Firewire interface connection; or a proprietary interface connection.

In some embodiments, the band system further comprises: a digital processing device comprising an operating system configured to perform executable instructions and a memory device operably linked to the battery circuit; a computer program including instructions executable by the digital processing device to create an application comprising a software module configured to manage a plurality of charging circuit conditions; a plurality of sensors configured to monitor battery charge parameters comprising: a portable digital device rechargeable battery charge level; a band system battery charge level; a rate of battery charge; and a rate of battery discharge; wherein the software module monitors the condition of the batteries of the band system and the condition of the rechargeable batteries of the portable digital device, and wherein the software module commands a change in the charging parameters of the portable digital device based at least in part on the power level in the battery of the portable digital device, the power level in the battery of the band system and input from a user. The digital processing device can be integrally placed within the flexible unitary part.

In some embodiments, the first detachable strap attachment interface 13 and the second detachable strap attachment interface 17, are each provided with an auxiliary capture clasp mechanism 80, as illustrated in FIGS. 12-A through 12-D, configured to augment and further secure the strap attachment interface 13, 17 to a portable digital device to prevent unintentional separation of the flexible unitary band system 10 from the portable digital device attachment interfaces.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein are optionally employed in practicing the invention. It is intended that the following claims define the scope of the invention and that methods and structures within the scope of these claims and their equivalents be covered thereby.

What is claimed is:

1. A band system for a wearable device, comprising:
a first flexible unitary part and a second flexible unitary part;
wherein the first flexible unitary part comprises a detachable first section at a first end and a second end, and wherein the second flexible unitary part comprises a detachable third section at a third end and a fourth end,
a first detachable strap attachment interface, having a first end and a second end, the first end affixable to the first section at the first end and configured to connect with a first device attachment interface of either a portable digital device or a case for holding the portable digital device;
a second detachable strap attachment interface, having a first end and a second end, affixable on the third section at the third end and configured to connect with a second device attachment interface of either the portable digital device or the case for holding the portable digital device;
wherein the first flexible unitary part comprises a strap connector comprising at least a first strap connection interface at the second end of the first flexible unitary part and configured to detachably connect with at least one second strap connection interface located near the fourth end of the second flexible unitary part;
a rechargeable battery within the first flexible unitary part or the second flexible unitary part; and
a single, quick disconnect band system charging interface within either the first detachable strap attachment interface or the second detachable strap attachment interface configured to interface with a mating single, quick disconnect charging interface of the first device attachment interface of either a portable digital device or a case for holding the portable digital device;
wherein the quick disconnect band system charging interface is operably linked to the rechargeable battery through a detachable connection mechanism between the first or second detachable strap attachment interface and a battery circuit.

2. The band system of claim 1, wherein the first detachable strap attachment interface and the second detachable strap attachment interface, are each provided with an adapter connection interface capable of connecting first detachable strap attachment interface with a mating (male/female) adapter connection interface on the first section at the first end of the first flexible unitary part and the second detachable strap attachment interface with a mating (male/female) adapter connection interface on the third section at the third end of the second flexible unitary part;
wherein the adapter connection interface of the first detachable strap attachment interface and the second detachable strap attachment interface comprises:
a magnetic interface connection;
a pin-type interface connection;
a USB interface connection;
a micro-USB interface connection;
a mini-USB interface connection; a USB-C interface connection;
a Lightning interface connection;
a Firewire interface connection; or
a proprietary interface connection; and
wherein the adapter connection interface of the first section at the first end of the first flexible unitary part and the third section at the third end of the second flexible unitary part comprises:
a magnetic interface connection;
a pin-type interface connection;
a USB interface connection;
a micro-USB interface connection;
a mini-USB interface connection;
a USB-C interface connection;
a Lightning interface connection;
a Firewire interface connection; or
a proprietary interface connection.

3. The band system of claim 1, further comprising:
at least a second rechargeable battery within the first flexible unitary part or the second flexible unitary part;
wherein the battery circuit optionally bridges the first flexible unitary part and the second flexible unitary part across the strap connector.

4. The band system of claim 1, wherein the band system charging interface comprises an adapter connection interface capable of interfacing with an adapter connection of a digital device comprising:
  a magnetic interface connection;
  a pin-type interface connection;
  a USB interface connection;
  a micro-USB interface connection;
  a mini-USB interface connection;
  a USB-C interface connection;
  a Lightning interface connection; and
  a Firewire interface connection.

5. The band system of claim 1, further comprising a plurality of separated batteries encased within one or both of the first flexible unitary part or the second flexible unitary part.

6. The band system of claim 1, further comprising a plurality of flex valleys on an external surface of the first flexible unitary part and second flexible unitary part that dip partially between the plurality of separated batteries in order for the band system to flex around a user's wrist.

7. The band system of claim 1, further comprising an on/off switch or button operatively connected to the battery circuit configured to toggle the battery circuit between an activated state (on) and a deactivated state (off).

8. The band system of claim 1, further comprising:
  a band system battery charging interface;
  wherein the band system battery charging interface is configured anywhere along an outer edge or exposed outer surface of the first flexible unitary part or the second flexible unitary part.

9. The band system of claim 8, further comprising:
  a charging adapter connection having a first end and a second end, each end an interchangeable adapter connection interface; and
  a flexible wired connection between the first charging adapter connection end and second charging adapter connection end;
  wherein the interchangeable adapter connection interfaces comprises:
    a magnetic interface connection;
    a pin-type interface connection;
    a USB interface connection;
    a micro-USB interface connection;
    a mini-USB interface connection;
    a USB-C interface connection;
    a Lightning interface connection;
    a Firewire interface connection; or
    a proprietary interface connection.

10. The band system of claim 1, further comprising a digital processing device comprising an operating system configured to perform executable instructions and a memory device operably linked to the battery circuit;
  a computer program including instructions executable by the digital processing device to create an application comprising a software module configured to manage a plurality of charging circuit conditions;
  a plurality of sensors configured to monitor battery charge parameters comprising:
    a portable digital device rechargeable battery charge level;
    a band system battery charge level;
    a rate of battery charge; and
    a rate of battery discharge;
  wherein the software module monitors the condition of the batteries of the band system and the condition of the rechargeable batteries of the portable digital device, and
  wherein the software module commands a change in the charging parameters of the portable digital device based at least in part on the power level in the battery of the portable digital device, the power level in the battery of the band system and input from a user.

11. The band system of claim 1, further comprising a digital processing device comprising an operating system configured to perform executable instructions and a non-transitory computer readable storage medium configured to store the executable instructions, operably linked to the battery circuit;
  the non-transitory computer readable storage medium including instructions executable by the digital processing device to create an application comprising a software module configured to manage a plurality of charging circuit conditions;
  a plurality of sensors configured to monitor battery charge parameters comprising:
    a portable digital device rechargeable battery charge level;
    a band system battery charge level;
    a rate of battery charge;
    and a rate of battery discharge;
  wherein the software module monitors the condition of the batteries of the band system and the condition of the rechargeable batteries of the portable digital device, and
  wherein the software module commands a change in the charging parameters of the portable digital device based at least in part on the power level in the battery of the portable digital device, the power level in the battery of the band system and input from a user.

12. A band system for a wearable device, comprising:
  a first flexible unitary part, a second flexible unitary part and a single elastic section between said first flexible unitary part and second flexible unitary part: wherein the first flexible unitary part comprises a first section and a second end,
  wherein the second flexible unitary part comprises a third section and a fourth end, and
  wherein the single elastic part, comprising a material with resilient elongation properties and further comprising a flexible portion of a battery circuit, is affixed to and adjoins the first flexible unitary part and the second flexible unitary part at or about the second and fourth ends of the second section and the fourth section,
  a first detachable strap attachment interface, having a first end and a second end, the first end affixable to the first section at the first end and configured to connect with a first device attachment interface of either a portable digital device or a case for holding the portable digital device;
  a second detachable strap attachment interface, having a first end and a second end, affixable on the third section at the third end and configured to connect with a second device attachment interface of either the portable digital device or the case for holding the portable digital device;
  a rechargeable battery within the first flexible unitary part or the second flexible unitary part; and
  a single, quick disconnect band system charging interface within either the first detachable strap attachment interface or the second detachable strap attachment interface configured to interface with a mating single, quick disconnect charging interface of the first device attachment interface of either a portable digital device or a case for holding the portable digital device;
    wherein the quick disconnect band system charging interface is operably linked to the rechargeable battery through a detachable connection mechanism and a battery circuit.

13. The band system of claim 12, wherein the first detachable strap attachment interface and the second detachable strap attachment interface, are each provided with an adapter connection interface capable of connecting first detachable strap attachment interface with a mating (male/female) adapter connection interface on the first section at the first end of the first flexible unitary part and the second detachable strap attachment interface with a mating (male/female) adapter connection interface on the third section at the third end of the second flexible unitary part;
    wherein the adapter connection interface of the first detachable strap attachment interface and the second detachable strap attachment interface comprises:
        a magnetic interface connection;
        a pin-type interface connection;
        a USB interface connection;
        a micro-USB interface connection;
        a mini-USB interface connection;
        a USB-C interface connection;
        a Lightning interface connection;
        a Firewire interface connection; or
        a proprietary interface connection; and
    wherein the adapter connection interface of the first section of the first flexible unitary part and the third section of the second flexible unitary part comprises:
        a magnetic interface connection;
        a pin-type interface connection;
        a USB interface connection;
        a micro-USB interface connection;
        a mini-USB interface connection;
        a USB-C interface connection;
        a Lightning interface connection;
        a Firewire interface connection; or
        a proprietary interface connection.

14. The band system of claim 12, further comprising:
    at least a second rechargeable battery within the first flexible unitary part or the second flexible unitary part;
    wherein the battery circuit optionally bridges the first flexible unitary part and the second flexible unitary part across the strap connector.

15. The band system of claim 12, wherein the band system charging interface comprises an adapter connection interface capable of interfacing with an adapter connection of a digital device comprising:
    a magnetic interface connection;
    a pin-type interface connection;
    a USB interface connection;
    a micro-USB interface connection;
    a mini-USB interface connection;
    a USB-C interface connection;
    a Lightning interface connection; and
    a Firewire interface connection.

16. The band system of claim 12, further comprising a plurality of separated batteries encased within one or both of the first flexible unitary part or the second flexible unitary part.

17. The band system of claim 12, further comprising a plurality of flex valleys on an external surface of the first flexible unitary part and second flexible unitary part that dip partially between the plurality of separated batteries in order for the band system to flex around a user's wrist.

18. The band system of claim 12, further comprising an on/off switch or button operatively connected to the battery circuit configured to toggle the battery circuit between an activated state (on) and a deactivated state (off).

19. The band system of claim 12, further comprising:
    a band system battery charging interface;
    wherein the band system battery charging interface is configured anywhere along an outer edge or exposed outer surface of the first flexible unitary part or the second flexible unitary part.

20. The band system of claim 19, further comprising:
    a charging adapter connection having a first end and a second end, each end having an interchangeable adapter connection interface; and
    a flexible wired connection between the first charging adapter connection end and second charging adapter connection end;
    wherein the interchangeable adapter connection interfaces comprises:
        a magnetic interface connection;
        a pin-type interface connection;
        a USB interface connection;
        a micro-USB interface connection;
        a mini-USB interface connection;
        a USB-C interface connection;
        a Lightning interface connection;
        a Firewire interface connection; or
        a proprietary interface connection.

\* \* \* \* \*